US009032748B2

(12) United States Patent
Lau et al.

(10) Patent No.: US 9,032,748 B2
(45) Date of Patent: May 19, 2015

(54) INDUSTRIAL FLUID CIRCUITS AND METHOD OF CONTROLLING THE INDUSTRIAL FLUID CIRCUITS USING VARIABLE SPEED DRIVES ON THE FLUID PUMPS OF THE INDUSTRIAL FLUID CIRCUITS

(76) Inventors: David Man Chu Lau, Victoria (AU); Ka Lim Shek, Sai Wan Ho (HK)

( * ) Notice: Subject to any disclaimer, the term of this patent is extended or adjusted under 35 U.S.C. 154(b) by 1024 days.

(21) Appl. No.: 12/280,201

(22) PCT Filed: Feb. 22, 2007

(86) PCT No.: PCT/AU2007/000202
§ 371 (c)(1),
(2), (4) Date: Aug. 21, 2008

(87) PCT Pub. No.: WO2007/095685
PCT Pub. Date: Aug. 30, 2007

(65) Prior Publication Data
US 2009/0020173 A1    Jan. 22, 2009

(30) Foreign Application Priority Data

Feb. 23, 2006 (AU) ................. 2006900911

(51) Int. Cl.
| | |
|---|---|
| *F25D 17/02* | (2006.01) |
| *F04D 15/02* | (2006.01) |
| *F24F 3/06* | (2006.01) |
| *F04B 41/06* | (2006.01) |
| *F04D 15/00* | (2006.01) |
| *F04C 14/02* | (2006.01) |
| *F24F 11/00* | (2006.01) |
| *F28D 21/00* | (2006.01) |

(52) U.S. Cl.
CPC ............. *F04D 15/029* (2013.01); *F04B 41/06* (2013.01); *F04D 15/0072* (2013.01); *F04C 14/02* (2013.01); *F24F 3/06* (2013.01); *F24F 2011/0083* (2013.01); *F28D 2021/0019* (2013.01); *F28F 2250/08* (2013.01)

(58) Field of Classification Search
CPC ....... F04D 15/029; F04D 15/0072; F24F 3/06; F24F 2011/0083; F25D 17/02; F04B 41/06; F04C 14/02; F28D 2021/0019; F28F 2250/08
USPC .................. 62/185, 201, 228.1, 228.4, 228.5; 60/431; 417/1–6, 44.1, 44.2, 45, 426
See application file for complete search history.

(56) References Cited

U.S. PATENT DOCUMENTS

| 4,210,957 A | * | 7/1980 | Spethmann ................... 700/276 |
| 4,463,574 A | * | 8/1984 | Spethmann et al. ............ 62/175 |
| 4,483,152 A | * | 11/1984 | Bitondo ......................... 62/175 |
| 4,546,618 A | * | 10/1985 | Kountz et al. .................. 62/201 |

(Continued)

*Primary Examiner* — Marc Norman
*Assistant Examiner* — Paolo Gonzalez
(74) *Attorney, Agent, or Firm* — Richard M. Goldberg

(57) ABSTRACT

An industrial fluid circulating system having at least one fluid circulation circuit, includes a plurality of pumps connected in parallel to circulate the fluid through each of the fluid circulation circuit, a separate motor driving each pump, a load detector to sense operating loads on the system and each circuit, and a speed control to vary the speed of each motor to thereby vary the pumping capacity of each pump in response to the detected load on the system, each pump of each respective circuit running simultaneously at a substantially similar speed or a predetermined equal reduced speed of the respective circuit or an almost equal reduced speed or a similar reduced speed.

4 Claims, 14 Drawing Sheets

(56) References Cited

U.S. PATENT DOCUMENTS

| | | | |
|---|---|---|---|
| 5,022,231 A * | 6/1991 | Martinez, Jr. | 62/99 |
| 5,138,845 A * | 8/1992 | Mannion et al. | 62/99 |
| 5,170,636 A * | 12/1992 | Hitosugi | 62/175 |
| 5,425,503 A * | 6/1995 | Corso | 237/63 |
| 5,540,555 A * | 7/1996 | Corso et al. | 417/44.2 |
| 5,946,926 A * | 9/1999 | Hartman | 62/201 |
| 6,045,331 A * | 4/2000 | Gehm et al. | 417/2 |
| 6,185,946 B1 * | 2/2001 | Hartman | 62/175 |
| 6,257,007 B1 * | 7/2001 | Hartman | 62/183 |
| 6,257,833 B1 * | 7/2001 | Bates | 417/4 |
| 6,276,152 B1 * | 8/2001 | Sibik | 62/201 |
| 6,666,042 B1 * | 12/2003 | Cline et al. | 62/175 |
| 6,715,691 B2 * | 4/2004 | Park et al. | 237/8 A |
| 6,939,109 B2 * | 9/2005 | Takahashi et al. | 417/3 |
| 7,028,768 B2 * | 4/2006 | Aler et al. | 165/219 |
| 2002/0157405 A1 * | 10/2002 | Haley et al. | 62/127 |
| 2003/0037919 A1 * | 2/2003 | Okada et al. | 165/206 |
| 2003/0235492 A1 * | 12/2003 | Mirsky et al. | 415/1 |
| 2004/0000155 A1 * | 1/2004 | Cline et al. | 62/175 |
| 2004/0016245 A1 * | 1/2004 | Pierson | 62/175 |
| 2004/0026075 A1 * | 2/2004 | Park et al. | 165/218 |
| 2004/0093893 A1 * | 5/2004 | Tanimoto et al. | 62/510 |
| 2005/0039904 A1 * | 2/2005 | Aler et al. | 165/219 |
| 2005/0103032 A1 * | 5/2005 | Pierson | 62/175 |
| 2006/0010893 A1 * | 1/2006 | Dominguez | 62/201 |
| 2007/0023534 A1 * | 2/2007 | Liu | 236/1 C |
| 2007/0028632 A1 * | 2/2007 | Liu | 62/185 |

\* cited by examiner

INDUSTRIAL FLUID CIRCUITS AND METHOD OF CONTROLLING THE INDUSTRIAL FLUID CIRCUITS USING VARIABLE SPEED DRIVES ON THE FLUID PUMPS OF THE INDUSTRIAL FLUID CIRCUITS

CROSS-REFERENCE TO RELATED APPLICATIONS

The present application claims priority from Australian Provisional Patent Application No 2006900911 filed on 23 Feb. 2006, the content of which is incorporated herein by reference.

BACKGROUND OF THE INVENTION

1. Field of the Invention

This Invention relates to an industrial process efficiency method and system and relates particularly to a method and system for improving the efficiency and performance of any industrial process that uses motor-driven pumps to move liquids, slurries, gases and other fluid or fluid-like material. The invention has particular application in the field of heating, ventilation and air-conditioning systems (HVAC) used, for example, for comfort conditioning for buildings. More specifically, the present invention is directed to methods and systems of improving the overall operating performance and efficiency of movement of fluids such as in HVAC systems.

While the invention has broad application throughout all areas of industry, such as in cool rooms, paper processing, water and/or sewage treatment plants, or any other system that incorporates fluid pumping and the like, for simplicity and ease of understanding the invention, it will be described herein in relation to its use in HVAC systems. It will be understood, however, that the invention is not limited to its use in such systems.

2. Description of Related Art

Compression type HVAC systems and direct expansion air conditioners are the most commonly used cooling systems for buildings nowadays. HVAC systems and direct expansion air conditioners operate by absorbing heat from the space being cooled either directly (direct expansion air conditioners) or by circulating a secondary fluid (e.g. water or air). Rejecting the heat that has been absorbed and has been generated by the cooling apparatus is accomplished almost universally by transferring the heat to the environment outside the building or space.

Known systems typically have a motor which drives a compressor drawing low pressure refrigerant gas from an evaporator and discharging it as a higher pressure hot gas into a condenser. In the condenser, the hot gaseous refrigerant is condensed into a high pressure liquid refrigerant which flows through an expansion device that regulates the flow of refrigerant into the evaporator. The low pressure refrigerant absorbs heat of vaporization from the chilled water or air circulating through the evaporator, and low pressure refrigerant vapor is drawn back into the inlet of the compressor and the cycle is continuously repeated.

Usually such cooling apparatus has some method of regulating cooling capacity for part load operations, such as a modulating scroll or vane apparatus which limits the amount of refrigerant through the compressor, or a variable speed apparatus which controls the rotational speed of the compressor, or both. The chilled water/hot water or chilled air/warmed air is generally circulated through a distribution system for comfort conditioning within the building.

In typical systems, the heat absorbed from the evaporator, along with the heat added by the compressor, is transferred to the external air through the condenser, preferably using cooling towers or the like.

When water is being chilled by the evaporator to about 4.4 to 10° C., it is then delivered by a chilled water pumps to the cooling load, which may include water cooling coils in terminals in which air is cooled and dehumidified.

In the prior art, several arrangements are used for connecting water chillers into chilled water supply and distribution systems. Further, several arrangements are used for condenser water cooling. However, all systems proposed previously suffer from inefficiencies when loadings vary from optimum design loadings.

For example, when cooling loads drop during part-load operation, the water volume flow rate of the plant loop primary chilled water circuit) keeps in constant flow and maintain in fall capacity which is recommended by all chiller configuration guidelines due to their awareness that any reduction of water flow rate in the primary water circuit may adversely affect the efficiency of chiller and may further lead to the instable operation of the chiller. In this connection, all prior arts which attempt to operate the primary chilled water pump at reduced speed in accordance with the load which will lower the water flow rate of primary chilled water circuit with respect to its original constant flow rate arrangement is not recommended by the chiller's manufacturers.

With regard to the secondary chilled water circuit (also known as building loop), when cooling loads drop during part-load operation, the water volume flow rate reduces in the building loop because control valves have been partially closed. The water pump, therefore, is caused to operate at a loading less than full capacity and therefore at less than maximum efficiency. In prior art, someone may use a variable speed drive to operate the secondary chilled water pump at reduced speed in accordance with the load, however the water flow rate of the secondary chilled water circuit is lowered too. And the extent of energy saving is not significant when compared with our present invention.

SUMMARY OF THE INVENTION

It is therefore desirable to provide a method and system to improve performance and efficiency, and thereby save energy significantly in industrial systems such as application in cool rooms, paper processing, water and/or sewage treatment plants, or any other system that incorporates fluid pumping and the like.

It is also desirable to avoid instability in chiller/boiler controls or other industrial process operation, and thus provide for stable operation of a chiller/boiler in an industrial system such as HVAC system.

It is also desirable to provide a novel, improved industrial liquid circulation system control that can operate without encountering control instability no matter whether the system demand is at maximum or part-load.

It is also desirable to incorporate a plurality of pump means in parallel flow relationship to operate at equal reduced speed or almost equal reduced speed or similar reduced speed in lieu of the original/traditional inefficient pumping arrangement, whereby the operating plurality of pump means providing the optimum or same flow capacity with respect to a percentage of the flow capacity of the original/traditional pumping arrangement.

It is also desirable to incorporate a plurality of pump means to operate at equal reduced speed or almost equal reduced speed or similar reduced speed to accomplish a predetermined target (a certain flow rate, a certain pressure differential, a desired chilled water leaving temperature, a desired discharge pressure, etc.) or in response to a loading signals.

It is also desirable to reduce the wear and tear rate of all components of an industrial process including those of industrial liquid circulation systems to extend the service life of the respective components which include the chilled water pumps, boiler pumps, condenser water pumps, general purpose pumps and piping of the industrial liquid circulation system circuit, etc.

It is also desirable to improve the power factor of the system and thereby significantly reduce the demand charge and the associated utility cost.

In accordance with a first broad aspect of the invention there is provided an industrial system having one or more liquid circulation circuits, the system including:

a plurality of pump means to circulate the liquid through the or each of said circuits,
motor means driving each pump means,
load sensing or detecting means to sense operating loads on the system and the circuits, and
speed control means to vary the speed of said motor means to thereby vary the pumping capacity of each pump means in response to the detected load on the system.

Preferably, the plurality of pump means each operate at equal reduced speed or almost equal reduced speed or similar reduced speed in accordance with the system load, with the motor means driving each pump means, and the speed control means varies the speed of said motor means the thereby vary the pumping capacity of each pump means in response to the detected load on the system or a predetermined target. (I.e. the same flow capacity with respect to the original/traditional pumping arrangement.)

In particular embodiments, the pumps may be used in cool rooms for circulating chilled water, in paper processing systems where the pumps are used to circulate slurries, cooling water, heating water, and the like, in water and/or sewage treatment plants, and in a wide range of other industries where liquids/fluids are pumped for a variety of purposes.

In accordance with a second aspect of the invention there is provided a refrigeration system having:
one or more chilled water, condenser water, and boiler water circuits,
a plurality of pump means of identical or similar capacity to circulate water through the or each of said circuits. The plurality of pump means to be running at equal reduced speed or almost equal reduced speed or similar reduced speed, motor means driving each pump means,
load detecting means to sense operating load on the system,
speed control means to vary the speed of said motor means the thereby vary the pumping capacity of each pump means in response to the detected load or a predetermined target on the system. (I.e. the same flow capacity with respect to the original/traditional pumping arrangement.)

In preferred embodiments, the efficiency of the HVAC system's water distribution circuit, which includes the chilled water circuit, boiler water circuit, and condenser water circuit, is improved by controlling two or more pumps for each circuit at equal reduced speed or almost equal reduced speed or similar reduced speed in accordance with system load or a predetermined target.

Preferably, embodiments of the invention employ a plurality of variable speed drives to operate the associated pumping components. Cooling system loading is indicated, i.e. by measuring the present power consumption of operating chiller(s)' compressor(s) using a power sensor, or the speed of the operating chiller(s)' compressor(s) using a tachometer or measuring the discharged chilled water/boiler temperature by temperature sensor located in an appropriate location in the water circuit or some other means from which loading can be inferred or pursuing a predetermined target (i.e. operate at the same flow capacity with respect to the original pumping arrangement's operating flow capacity) This strategy sets operation of the plurality of condenser water pumps, chilled water pumps and boiler pumps running at their respective circuit's predetermined equal reduced speed or at almost equal reduced speed or similar reduced speed and can deliver the optimum or same flow capacity with respect to the original/traditional designed pumping arrangements or at a power setting that is a fixed ratio of the cooling system current power ratio or loading (percent of maximum and subject to limits).

Preferably, the method includes the control and integrating of the plurality of chilled water pumps, boiler water pumps and condenser water pumps operating simultaneously at respective circuit's predetermined equal reduced speed or almost equal reduced speed or similar reduced speed in response to the loading level of the circulating system.

The general formula employed in embodiments of this invention for setting the power set point for each device may be expressed as:

$$PR\text{-}SP.sub.pd = C * PR.sub.load$$

Where PR-SP.sub.pd is the power ratio (percent of maximum) set point of the respective pumping devices being controlled.

Where PR.sub.load is the current loading/power ratio percent of maximum) that is being utilized by a circuit or system or a HVAC system/air conditioning compressor(s) or apparatus(s).

Where C is a selected constant.

The above equation has a low limit to prevent a power ratio set point being so low as to result in all fluid flow, e.g., all air or water flow, ceasing, and a high limit to ensure the power ratio set point would never rise above undesired flow rates and pressure outputs.

According to a fisher aspect of the invention particularly adapted for use with HVAC system there is provided a variable capacity, compression type, chilled fluid cooling system comprising:
a heat absorbing circuit (also known as chilled water circuit) including:
two or more chilled water pumps
a variable-frequency drive circuit for powering each of the chilled water pumps;
a chiller with evaporator operatively coupled to a numbers of cooling loads,
and a suction line leading back to said chiller;
water passing through said chiller in a heat exchange relationship and being cooled;
motor means for driving said chilled water pumps;
means for varying the speed of said motor means;
means for sensing the temperature of water leaving said chiller; and
means for controlling the variable-speed drive circuit in response to the present load on the compressor or a predetermined target so as to regulate operation of the variable speed pumps and simultaneously running at equal reduced speed or almost equal reduced speed or similar reduced speed in response to the load on the compressor or a predetermined target.

Preferably, the chiller includes means for regulating the flow of refrigerant gas through the compressor, and the means for determining a present load on the compressor makes that determination in response to a present state of the gas flow regulating means in the compressor.

In one form, the means for determining a present load on the compressor makes that determination in response to a level of power applied to the compressor motor or the sensed temperature of water leaving said chiller. Alternatively, the means for controlling said means for varying the speed of said variable speed pumps simultaneously at equal reduced speed or at almost equal reduced speed or at similar reduced speed acts responsive to the manual judgment of skilled personnel.

Preferably, the means for determining a present load on the compressor and the means for controlling the variable speed drive circuit is configured to regulate the variable speed drive circuit at the predetermined percentage of full power thereby running the chilled water pumps simultaneously at predetermined equal reduced speed or at almost equal reduced speed or at similar reduced speed to save power while system loading is at maximum or below maximum loading.

In one embodiment, the pumps comprise variable speed pumps powered by corresponding variable-speed drive circuits; and further comprising:
means for controlling the variable speed drive circuit in response to the present load on the compressor or a predetermined target so as to regulate operation of the chilled water pumps simultaneously at equal reduced speed or at almost equal reduced speed or at similar reduced speed in response to the load on the compressor or a predetermined target.

In another form, the variable speed drive circuits are connected to power the chilled water pumps, thereby regulating operation of said two or more pumps simultaneously at equal reduced speed or at almost equal reduced speed or at similar reduced speed responsive to loading on the compressor or a predetermined target.

According to a further aspect of the invention there is provided a system comprising:
a heat absorbing circuit (also known as chilled water circuit) including:
three or more chilled water pumps,
a variable-speed drive circuit for powering each of the chilled water pumps;
two chillers with evaporators being programmed to one is kept operating and the other remains shutdown/standby in response to a certain degree of part load or two are kept operating in response to a certain degree of full load operatively coupled to a numbers of cooling loads; and
and a suction line leading back to said chillers;
water passing through said chillers in a heat exchange relationship and being cooled;
motor means for driving said two or more predetermined operating chilled water pumps;
means for varying the speed of said two or more operating motors means;
means for sensing the temperature of water leaving said operating chiller(s);
means for controlling the operating variable-speed drive circuits in response to the present load on the operating compressor or a predetermined target so as to regulate operation of the two or more predetermined chilled water pumps simultaneously running at equal reduced speed or almost equal reduced speed or similar reduced speed in response to the load on the operating compressor or a predetermined target.

Preferably, in accordance with this embodiment, the chillers include means for regulating the flow of refrigerant gas through the compressors, and the means for determining a present loads on the compressors makes that determination in response to a present state of the gas flow regulating means in the compressors.

Preferably, the means for determining a present load on the operating compressor(s) makes that determination in response to a level of power applied to the operating compressor(s)' motor(s) or in response to the sensed temperature of water leaving said operating chiller.

Preferably, the means for controlling said means for varying the speed of said two or more predetermined operating chilled water pumps simultaneously at equal reduced speed or at almost equal reduced speed or at similar reduced speed act responsive to the manual judgment of skilled personnel.

In one arrangement, the means for determining a present load on the operating compressor and the means for controlling the operating variable-speed drive circuit are configured to regulate the operating variable-speed drive circuits at the predetermined percentage of full power thereby running the two or more operating chilled water pumps simultaneously at predetermined equal reduced speed or at almost equal reduced speed or at similar reduced speed to save power while system loading is at maximum or below maximum loading.

According to another aspect of the invention there is provided a variable capacity, compression type, chilled fluid cooling system comprising:
a heat rejection circuit (also known as condenser water circuit) including:
at least two condenser water pumps
a variable-frequency drive circuit for powering each of the condenser water pumps;
a chiller with condenser operatively coupled to a number of cooling towers
and a suction line leading back to said chiller with condenser;
water passing through said chillers with condenser in a heat exchange relationship and being heated;
motor means for driving said two or more operating condenser water pumps;
means for varying the speed of said motors means;
means for sensing the temperature of water leaving said chillers; and
means for controlling the variable-speed drive circuits in response to the present load on the compressor or a predetermined target so as to regulate operation of the two or more operating condenser water pumps simultaneously running at equal reduced speed or at almost equal reduced speed or at similar reduced speed in response to the loading on the operating compressor(s) or a predetermined target.

In accordance with a still further aspect of the invention there is provided a method of operating an industrial system having one or more water, or other liquid circulation circuits, comprising the steps of providing a plurality of pump means to circulate water through the or each of said circuits, operating motor means to drive each pump means, sensing operating loads on the system and the circuits, and vary the speed of said motor means the thereby vary the pumping capacity of each pump means in response to the sensed load on the system or a predetermined target.

According to a further aspect of the invention there is provided a method of operating a variable capacity, compression type cooling system having a plurality of chilled water pumps, condenser water pumps, boiler pumps, the method comprising the steps of determining a present load level of the compressor or a pursuing a predetermined target and regulating operation of the respective plurality of primary chilled water pumps, secondary chilled water pumps, boiler pumps, condenser water pumps running at respective circuit's predetermined equal reduced speed or at almost equal reduced speed in response to the present load level of the compressor(s) or pursuing a predetermined target.

According to another aspect of the invention there is provided an industrial fluid circulating system having one or more fluid circulation circuits, the system including:
a plurality of pump means to circulate the fluid through the or each of said circuits,
motor means driving each pump means,
load sensing or detecting means to sense operating loads on the system and the circuits, and
speed control means to vary the speed of said motor means to thereby vary the pumping capacity of each pump means in response to the detected load on the system.

According to a further aspect of the invention there is provided a method of operating an industrial system having one or more water, or other fluid circulation circuits comprising the steps of:
providing a plurality of pump means to circulate fluid through the or each of said circuits;
operating motor means to drive each pumps means,
sensing operating loads on the system and the circuits; and
varying the speed of said motor means at respective circuit's predetermined equal reduced speed or at almost equal reduced speed or at similar reduced speed to thereby vary the pumping capacity of each pump means in response to the sensed load on the system; or in response to a predetermined target; or in response to manual judgment of skilled personnel.

According to a still further aspect of the invention there is provided an industrial fluid circulating system having a plurality of fluid circulation circuits, the system including:
a variable capacity, compression type, chilled fluid cooling system comprising:
a single circuit chilled water system including:
at least two chilled water pumps;
a chiller with evaporator operatively coupled to a numbers of cooling loads
and a suction line leading back to said chiller;
water passing through said chiller in a heat exchange relationship and being cooled;
motor means for driving said chilled water pumps;
a variable-speed drive circuit for powering each of the motor means to vary the speed of the chilled water pumps;
means for sensing the temperature of water leaving said chiller; and
means for controlling the variable-speed drive circuit in response to the present load on a system compressor so as to regulate operation of the said at least two chilled water pumps running at equal reduced speed or at almost equal reduced speed or at similar reduced speed simultaneously in response to the load on the compressor.

In order that the invention is more readily understood, embodiments thereof will now be described with reference to the accompanying drawings.

PRIOR ART

Figure 1:
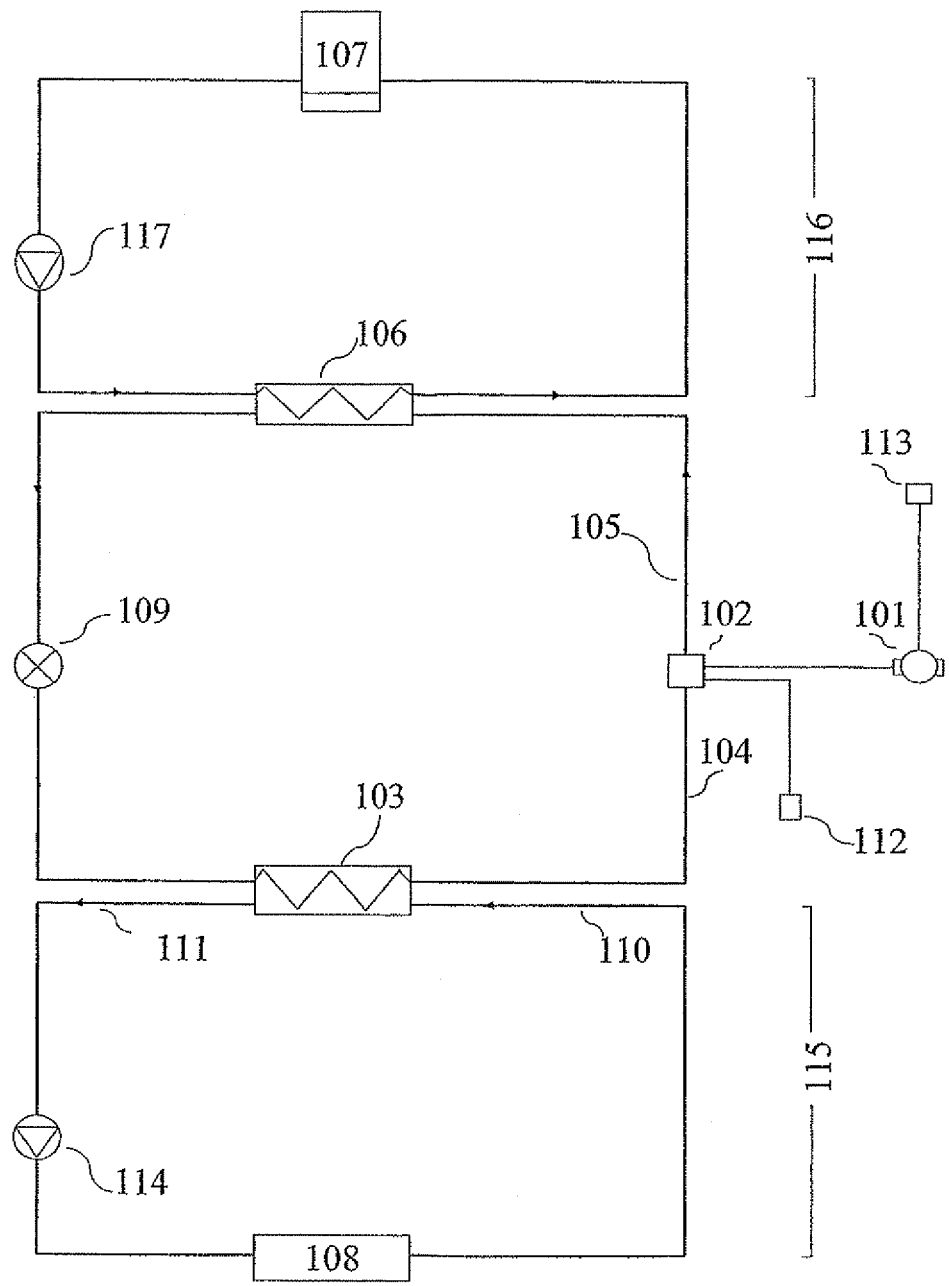
FIG. 1 is a schematic of a typical prior art HVAC system with a water-cooled condenser

FIG. 1 illustrates the major components of a typical compression cycle cooling apparatus. In this system, a motor (101) drives the compressor (102), which draws low pressure refrigerant gas from the evaporator (103) through a suction line (104), compresses it, and discharges it as a higher pressure hot gas through a hot gas line (105) into the condenser (106). In the condenser, the hot gaseous refrigerant is condensed into a liquid by rejecting heat to outside air by blowing outside air across the condenser with a fan driven by an electric motor (118) (not shown here) or by rejecting heat to tepid water from a cooling tower (107) through a condenser water circuit (116) which employs condenser water pump(s) (117). The condensed liquid refrigerant flows through an expansion device (109) that regulates the flow of refrigerant into the evaporator (103), which is held at a low pressure by the operation of the compressor. The low pressure environment causes the refrigerant to change state to a gas and as it does so, it absorbs the required heat of vaporization from the chilled water or air circulating through the evaporator, entering at (110) and leaving at (111). The low pressure refrigerant vapor is drawn into the inlet of the compressor and the cycle is continuously repeated. Usually such cooling apparatus has some method of regulating cooling capacity for part load operations such as a modulating scroll or vane apparatus (112) which limits the amount of refrigerant through the compression device, or a variable speed apparatus (113) which controls the rotational speed of the compression device, or both. The chilled water/hot water or chilled air/warmed air is circulated through a distribution circuit (115) for comfort conditioning, or to provide cooling for certain processes within the building. In this circuit (115), the heat absorbed from the evaporator (103) along with the heat added by the compressor (102) are rejected to the outside air through condenser fan(s) (not shown here) or cooling tower(s) (107).

The chilled water being cooled by the evaporator (103) is then delivered by the chilled water pump(s) (114) to the cooling load(s) (108) which include: water cooling coils in AHUs and terminals in which air is cooled and dehumidified. After flowing through the cooling load(s) (108), the chilled water increases in temperature up to (about 15.6 to 18.3° C.) and then returns to the evaporator (103).

Figure 2:
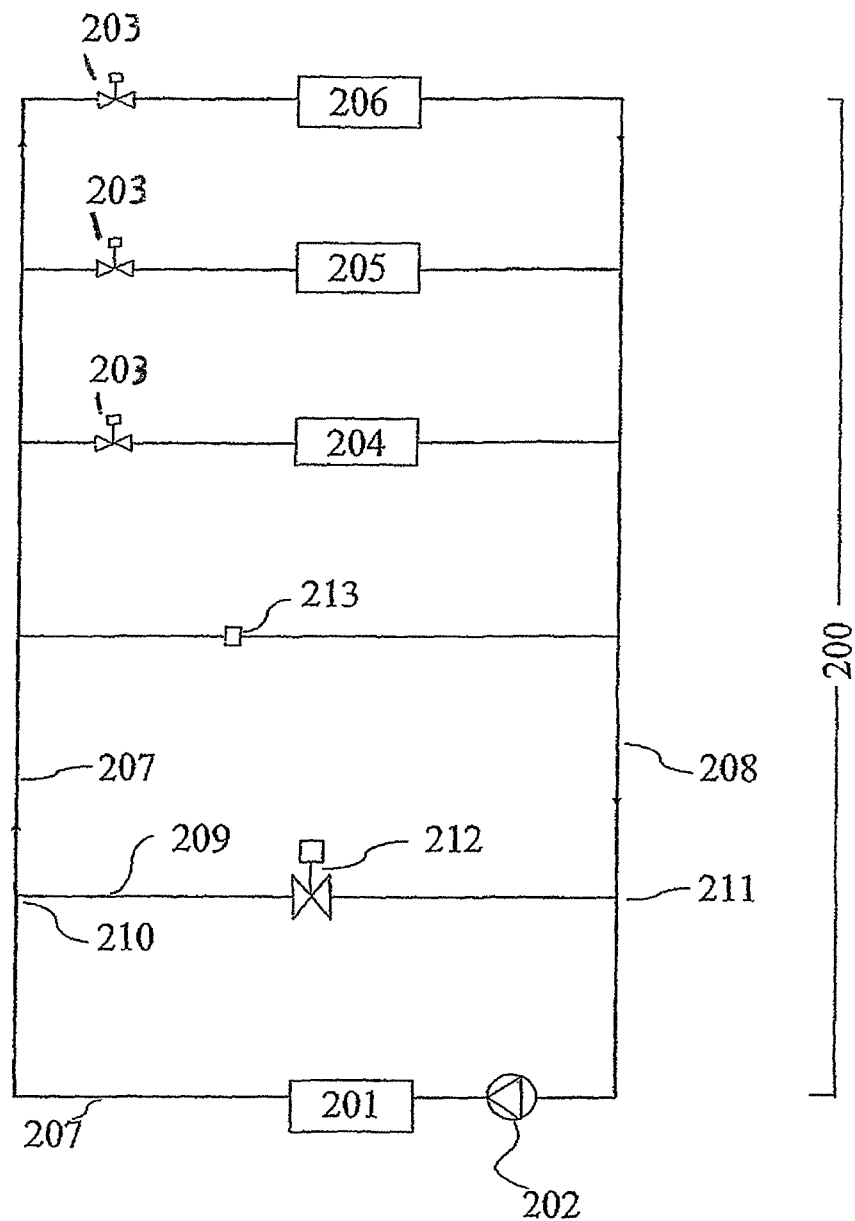
FIG. 2 is a schematic of a typical prior art HVAC system with a plant-through building loop (also known as "single circuit") chilled/boiler water system.

In the prior art, there are several arrangements for connecting water chillers into chilled water supply and distribution systems. FIG. 2 illustrates a typical plant-through building loop system (200) (also known as "single circuit system"). The plant-through building loop system include: chilled water, hot water or dual-temperature water systems in which water is transported only by plant (chiller/boiler) pump(s). A plant-through-building loop water system using bypass throttling flow is one of the older chilled/hot water systems that have been adopted in commercial buildings since the use of two-way control valves. For each chiller/boiler (201), a corresponding plant constant-speed water pump (202) is installed. The chilled or hot water is supplied through valves (203) to the load terminals (204,205 and 206) through the supply (207) and return (208) mains and branches, and is then returned to the chiller/boiler (201). There is a crossover bridge (209, sometimes called a common pipe) that connects the supply and return mains at junctions (210) and (211). A bypass two-way control valve (212) is often installed on the crossover bridge. A pressure-differential transmitter (213) and pressure relief valve are used to maintain a set pressure differential across the supply and return mains by modulating the opening of the bypass two-way control valve (212) when the system pressure tends to increase during part-load operation. A portion of the water is throttled in the control valve and flows through the crossover bridge (209). It is then combined with water from the return main (208) and returns to the chiller/boiler (201). A constant flow (or approximately constant flow) is maintained in the chiller/boiler (201).

A plant-through-building loop using bypass throttling control cannot save much pumping energy during part-load operation; it sometimes consumes even more energy. The surplus energy which is more than required is dissipated by mechanical means. Plant-through-building loop using bypass throttling control still has applications in small projects and especially in retrofit where space may not be available for a plant-building loop system.

Figure 3:
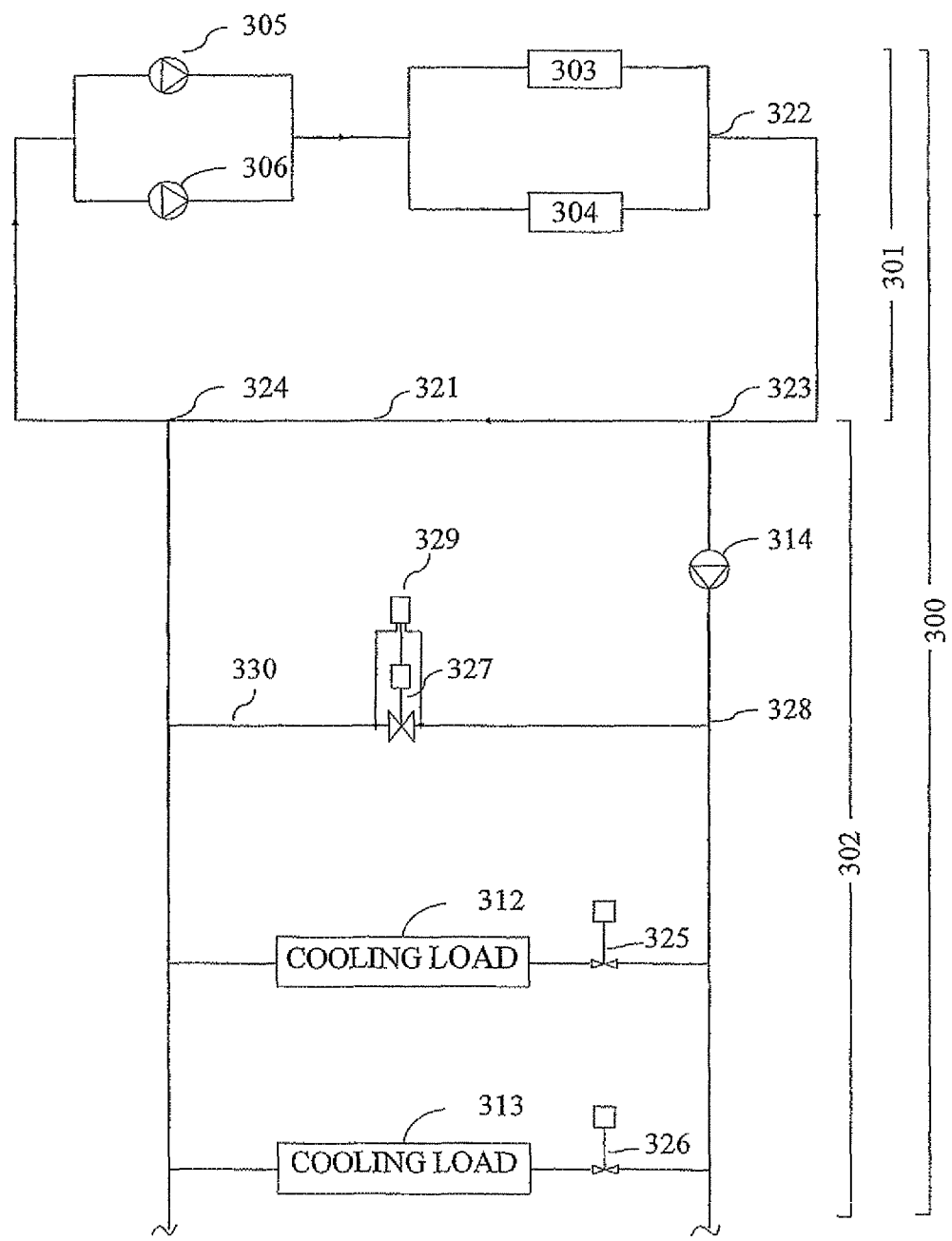
FIG. 3 is a schematic of a typical prior art HVAC system with a plant-building loop (also known as "primary-secondary water circuit") chilled/boiler water system.

FIG. 3 illustrates another prior art chiller arrangement: Plant-building loop (300) water systems. This is also called Primary-Secondary loop (or circuit) water systems, and is the widely adopted water systems for large commercial HVAC installations in the world today. A plant-building loop (300) include: chilled water, hot water, or dual-temperature water system consists of two piping loops, namely, plant loop primary loop) (301) and building loop (secondary loop) (302).

In plant loop (primary loop) (301), there are chillers (303, 304), plant pumps (primary chilled water pumps) (305, 306), diaphragm expansion tank, corresponding pipes and fittings, and control systems. A constant volume flow rate is maintained in the evaporator of each chiller (303,304). The chilled water volume flow rate in the plant loop (301) will vary when a chiller (303 or 304) and its associated chiller pump (305, 306,) are turned on or off.

In building loop (secondary loop) (302) there are cooling loads (312,313), building pumps (secondary chilled water pumps) (314), two-way control valves (325,326) and control systems, and corresponding pipes, fittings, and accessories.

The water flow in the building loop (302) is varied as the coil load is changed from the design load to part-load.

A short common pipe (321), sometimes also called a bypass, connects these two loops (301 and 302) and combines them into a plant-building loop (300). The common pipe (321) ensures that differences in flows between the primary and secondary water circuits will not affect the operation of either circuit. The common pipe (321) serves as a bypass for both circuits, which is needed to maintain constant flow in the primary circuit.

At design load, chilled water leaving the chillers (303,304) at point (322) flows through the junction of the common pipe (321), plant loop (301), and building loop (302) at point (323), is extracted by the building pump (secondary chilled water pump) (314), and is supplied to the cooling loads (312, 313). From the cooling loads (312,313), chilled water returns through another junction of the building loop (302) at point (324). There is only a very small amount of bypass chilled water in the common pipe that flows in the direction from point (323) to (324). The chilled water returned from the cooling loads (312,313) is then combined with the bypass water from the common pipe (321) and bypass line (330) and is extracted by the plant pump(s) (305,306) and enters the chiller(s) (303,304) for cooling again.

When the cooling loads (312,313) drop during part-load operation, the water volume flow rate reduces in the building loop (302) because the control valves (325,326) have been partially closed. Chilled water then divides into two flows at the junction (328). One is supplied to the cooling loads (312, 313); the remaining water bypasses the building loop by flowing through the bypass line (330) through valve (327) which is controlled by a differential pressure sensor (329), is extracted by the plant pump(s) (305,306) and returns to the chiller(s) (303,304).

Figure 4:
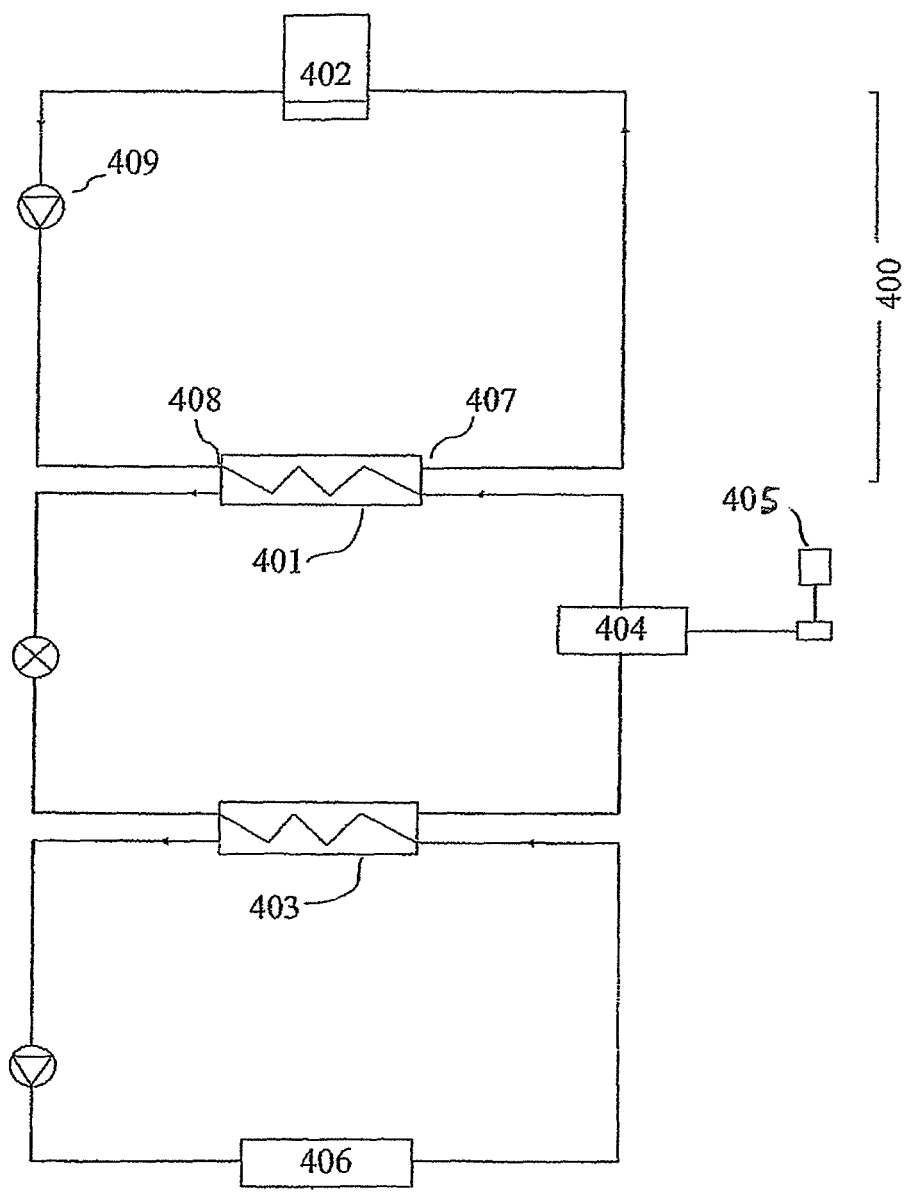
FIG. 4 is a schematic of a typical prior art HVAC system with a condenser water circuit

FIG. 4 illustrates a prior art condenser water circuit (400) of HVAC system. In this condenser water circuit (400), the heat generated by various cooling apparatus, i.e. compressor (404), motor (405) and cooling load(s) (406) are absorbed by condenser water at point (407), the condenser water is then forced through the cooling tower (402) by condenser water pump (409), and then back to condenser (401) at point (408) again. In this condenser (401), tepid water from the sump of a cooling tower (402) is circulated through the condenser (401) by a pump (409), and then to spray nozzles or distribution flume which distributes the water over slats or plastic fill that breaks the water up into droplets with a very large surface area such that a fan driven by an electric motor forces air over the water, evaporating a portion of it to provide adiabatic cooling of the water. The cooled water gathers in the sump where the water lost through evaporation is made up by adding water from a water supply. The level of water in the tower sump is maintained by a water level sensor, which operates a valve. Water in the sump is drawn through the condenser (401) to provide continuous rejection of the heat absorbed from the cooling loads through the evaporator (403) and that generated by the cooling apparatus, such as the compressor (404).

DETAILED DESCRIPTION OF PREFERRED EMBODIMENTS

Figure 5A:
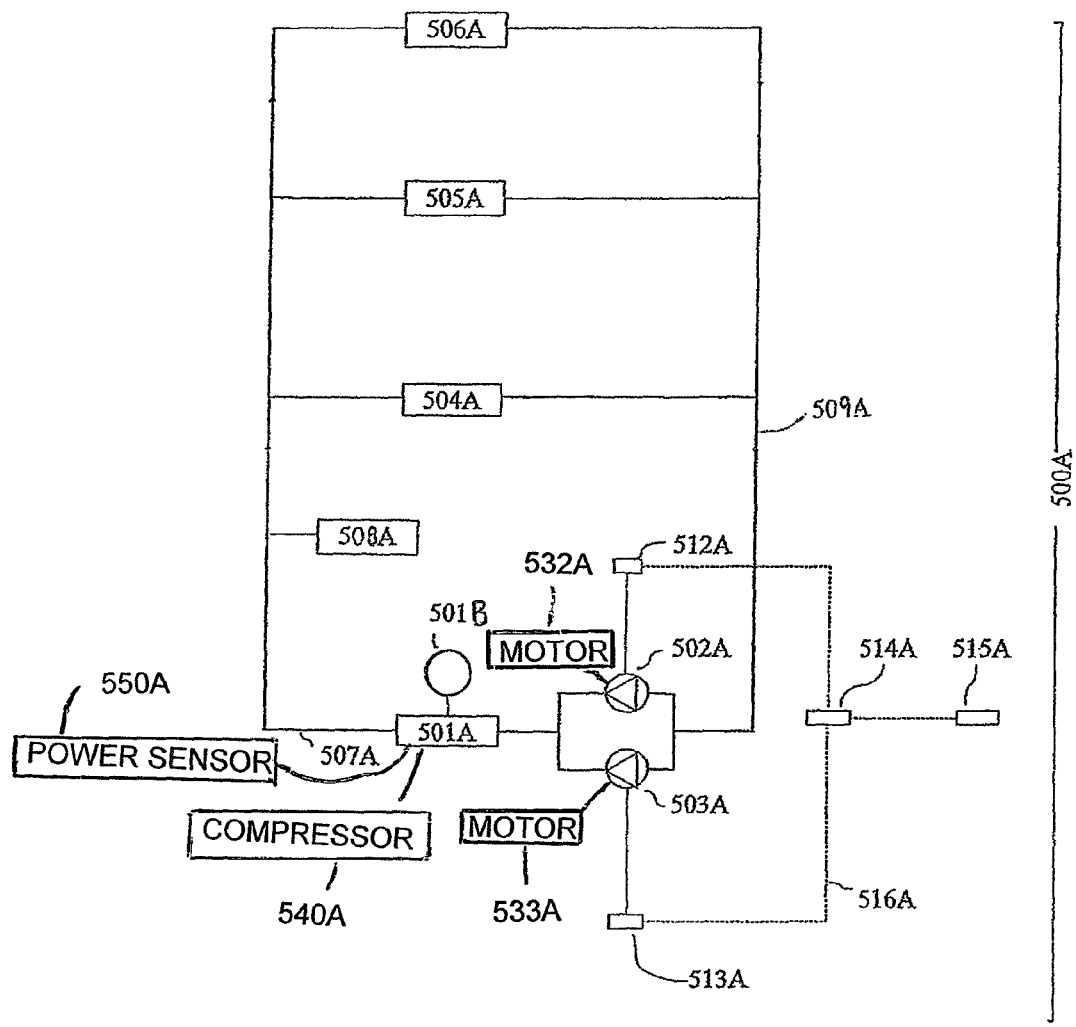
FIG. 5A is a schematic of a typical HVAC system with a plant-through building loop (also known as "single circuit") chilled/boiler water system in accordance with one embodiment of the invention.

FIG. 5A illustrates one embodiment of this invention utilizing variable speed control of two motor-driven, chilled water pumps/boiler pumps operating at predetermined equal reduced speed or at almost equal reduced speed or at similar reduced speed in lieu of the original/traditional pumping arrangement as shown in FIG. 2. A chilled water/boiler circuit (500A) (plant-through building loop system, also known as "single circuit system"), in this case, two (chilled water/boiler) motor/pump sets (shown together as 502A and 503A) of identical or similar capacity and each including a pump driven by its own electric motor 532A and 533A, respectively, are deployed to transport the produced chilled water/hot water throughout the water circuit (500A) and to loads (504A, 505A and 506A) through the supply (507A) and return (509A) mains. Throughout the specification, reference to a motor/pump set means that the motor/pump set includes only one pump driven by its own separate electric motor. Such a circuit may be part of an HVAC system for heating and/or cooling a building or other structure. The pumps of the pump/motor sets (502A and 503A) are connected in parallel and operate in predetermined equal reduced speed or almost equal reduced speed or similar reduced speed simultaneously. Said two pumps (502A and 503A) and respective motors (532A and 533A) are controlled by two variable speed drives (512A and 513A) connected to the respective motors and the two drives are commanded by a Controller (514A). The Controller (514A), monitors the present loading on the water system (500A) either by measuring the present power consumption of operating chiller's compressor (540A) using a power sensor (550A), or the speed of the operating chiller's (501A) compressor (540A) using a tachometer (501B), or measuring discharged chilled water/boiler temperature by temperature sensor (508A) located in appropriate location in the water circuit or some other means from which loading can be inferred. Based on that loading signal (515A), an algorithm calculates the optimum power loading (subject to limits) for the pumps and sends an output signal (516A) to the variable speed drives (512A and 513A) operating the (chilled water/boiler water) pumps and corresponding motors (502A and 503A) such that the motors of the pump/motor sets (502A and 503A) are incorporated to run at equal reduced speed or almost equal reduced speed or similar reduced speed simultaneously and operate at the optimum power percentage (or ratio) of maximum power draw based on the present percentage (or ratio) of maximum loading on the water circuit (500A).

In the event of variable speed drives (512A or 513 A) or chilled water pumps/boiler pumps and corresponding motors's (502A or 503A) failure, an integral bypass switch (not shown here as it is irrelevant to the present invention), can be operated either manually or automatically to allow the operative motor to be operated at full speed. At the same time, an alarm signal will be shown and sent to an appropriate location as required alerting appropriate personnel to take necessary actions.

Figure 6A:
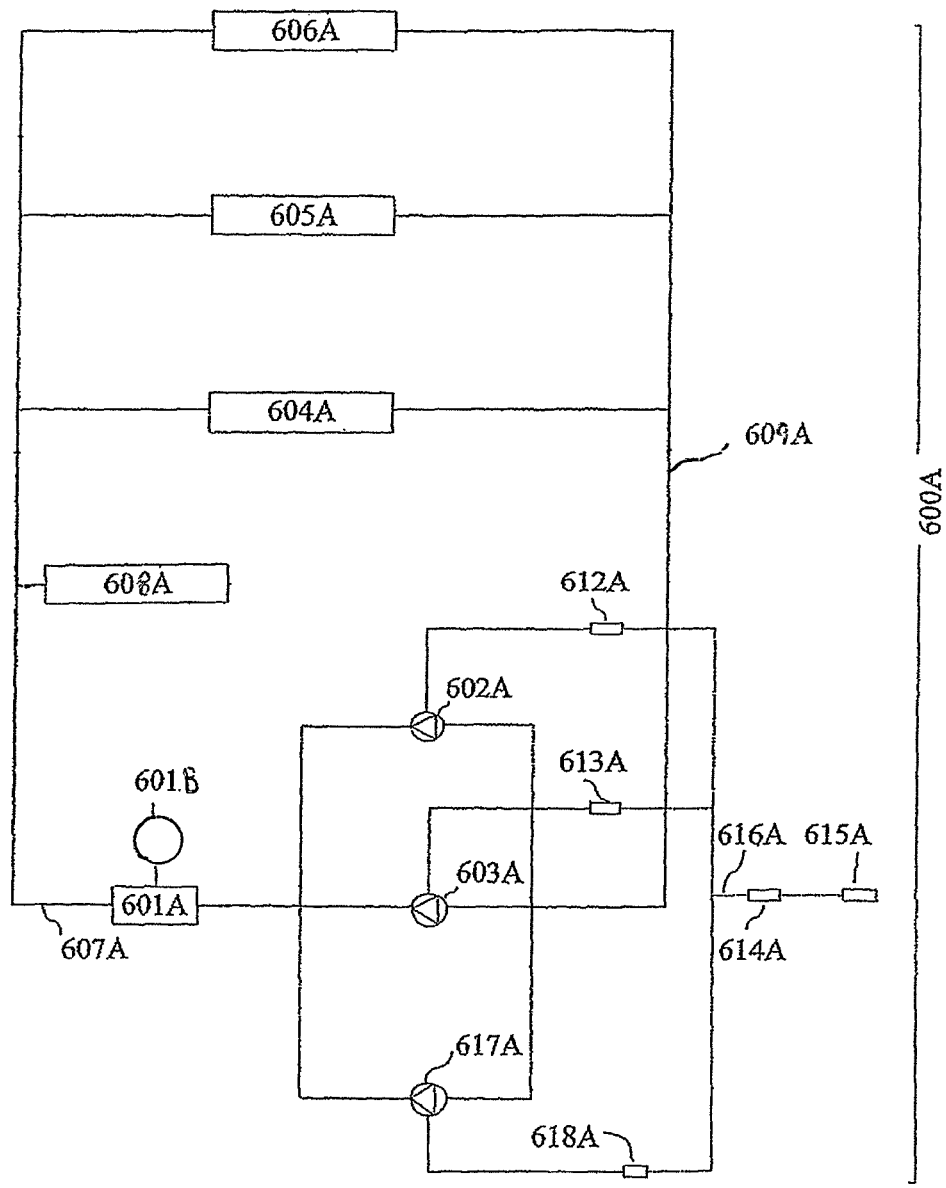
FIG. 6A is a schematic of a typical HVAC system with a plant-through building loop (also known as "single circuit") chilled/boiler water system in accordance with another embodiment of the invention.

FIG. 6A illustrates second embodiment of this invention utilizing variable speed control of three motor-driven chilled water pumps/boiler pumps operating at predetermined equal reduced speed or almost equal reduced speed or similar reduced speed in lieu of the original/traditional designs' pumping arrangement as shown in FIG. 2. A chilled water/boiler circuit (600A) ("plant-through building loop system", also know as "single circuit system"), in this case, three (chilled water/boiler) motor/pump sets (602A, 603A, 617A) of identical or similar capacity and each including a pump driven by its own electric motor, are deployed to transport the produced chilled water/hot water throughout the water circuit (600A) and to loads (604A, 605A and 606A) through the supply (607A) and return (609A) mains. Such a circuit may be part of an HVAC system for heating and/or cooling a building or other installation or structure. Said three pumps of the pump/motor sets (602A, 603A, and 617A) are connected in parallel and operate in predetermined equal reduced speed or almost equal reduced speed or similar reduced speed simultaneously. Said three pumps and respective motors (602A, 603A, 617A) are controlled by three variable speed drives (612A, 613A, 618A) connected to the respective motors of the pump/motor sets and the three drives are commanded by a Controller (614A). The Controller (614A), monitors the present loading on the water system (600A) either by measuring the present power consumption of operating chiller's compressor using a power sensor, or the speed of the operating chiller's (601A) compressor using a tachometer (601B) or measuring discharged chilled water/boiler temperature by temperature sensor (608A) located in appropriate location in the water circuit or some other means from which loading can be inferred. Based on that loading signal (615A), an algorithm calculates the optimum power loading (subject to limits) for the pumps and sends an output signal (616A) to the variable speed drives (612A, 613 A, 618A) operating the (chilled water/boiler water) pumps and corresponding motors (602A, 603 A, 617A) such that the motors of the pump/motor sets (602A, 603A, 617A) are incorporated to run at equal reduced speed or almost equal reduced speed or similar reduced speed simultaneously and operate at the optimum power percentage (or ratio) of maximum power draw based on the present percentage (or ratio) of maximum loading on the water circuit (600A).

In the event of variable speed drive (612A, 613A, 618A) or chilled water pumps/boiler pumps and corresponding motors's (602A, 603A, 617A) failure, an integral bypass switch (not shown), can be operated either manually or automatically to allow the operative motor to be operated at predetermined speed. At the same time, an alarm signal will be shown and sent to an appropriate location as required alerting appropriate personnel to take necessary actions.

Figure 7A:
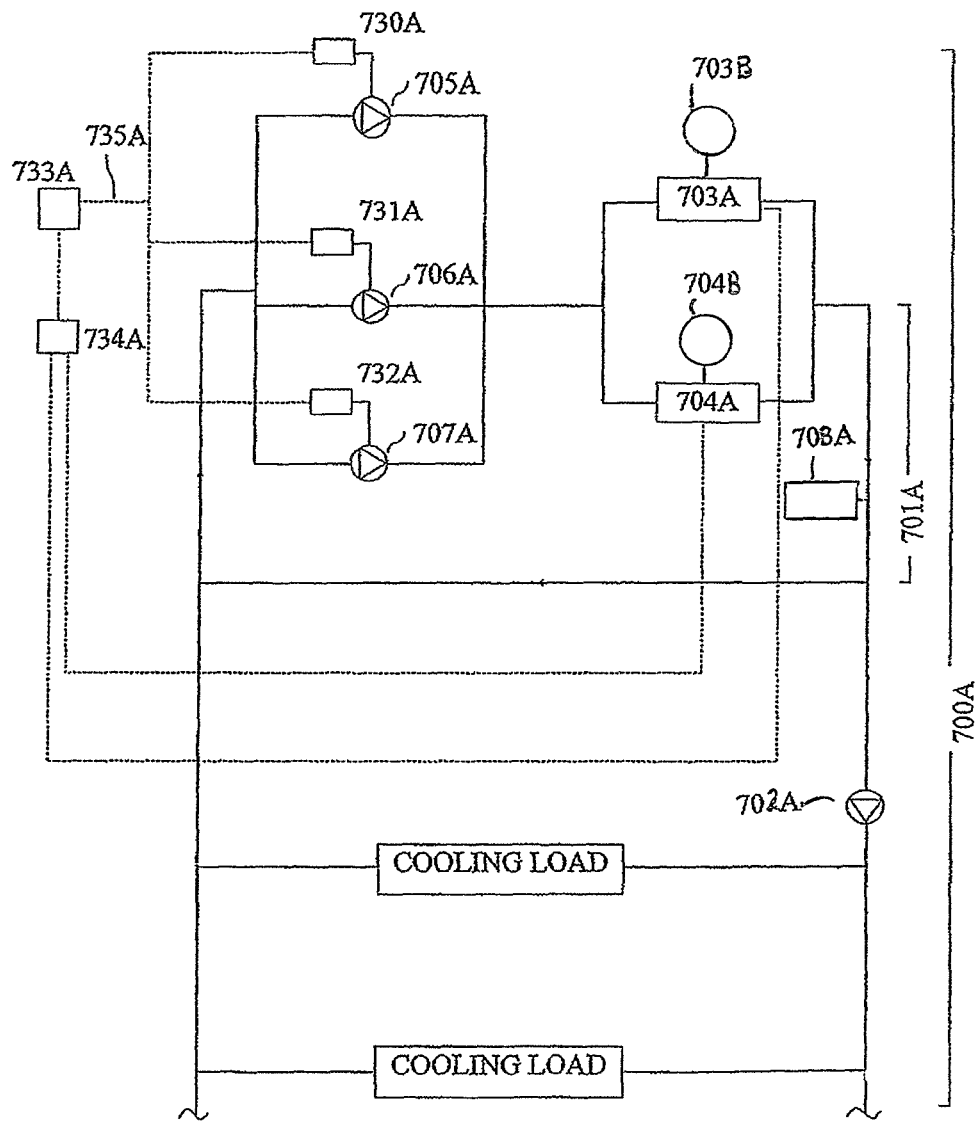
FIG. 7A is a schematic of a typical HVAC system with a plant-building loop (also known as "primary-secondary circuit") chilled/boiler water system in accordance with another embodiment of the invention.

FIG. 7A illustrates third embodiment of this invention utilizing variable speed control of two primary chilled water/boiler pumps operating at predetermined equal reduced speed or almost reduced speed or similar reduced speed in lieu of the original/traditional pumping arrangement as shown in FIG. 3 when one chiller is operating. A chilled water/boiler circuit (700A) ("plant-building loop system" also known as "primary-secondary chilled/boiler water circuit"), in this case, in the plant loop (701A), two plant motor/pump sets; in the combination of (705A and 706A) or (705A and 707A) or (706A and 707A) of identical or similar capacity, and each including a pump driven by its own electric motor, are deployed to transport the produced chilled/boiler water through the plant loop water circuit (701 A) (also known as "primary loop") if only one chiller/boiler (703A or 704A) is operating at the mean time and the other remains on standby in accordance with the current loading. A secondary circuit pump (702A) circulates water in the secondary circuit containing the cooling loads. The respective two predetermined pumps of the pump/motor sets (the predetermined combination of 705A, 706A, and 707A) are connected in parallel and operate in predetermined equal reduced speed or almost equal reduced speed or similar reduced speed simultaneously. The pumps and the corresponding driving motors (705A, 706A and 707A) are controlled by corresponding variable speed drive (VSD) connected to the respective drive motors (730A corresponds to plant pump 705A, 731A corresponds to plant pump 706A, 732A corresponds to plant pump 707A) and the said drives (730A, 731A, 732A) are commanded by a Controller (733A). The Controller (733A), monitors the present loading on the water system either by measuring the present power consumption of operating chiller's (703A or 704A) compressor using a power sensor, or the speed of the operating chiller's (703A or 704A) compressor using a tachometer (703B, 704B) or measuring discharged chilled/boiler water temperature by temperature sensor (708A) located in appropriate location in the water circuit or some other means from which loading can be inferred. Based on that loading signal (734A), an algorithm calculates the optimum power loading (subject to limits) for the pumps and sends an output signal (735A) to the respective two predetermined variable speed drives (730A,731A,732A) operating the two corresponding plant pumps (said combination of 705A,706A,707A) such that the two corresponding pumps (said combination of 705A,706A,707A) are incorporated to run at equal reduced speed or almost equal reduced speed or similar reduced speed simultaneously and operate at the optimum power percentage (or ratio)(subject to limits) of maximum power draw based on the present percentage (or ratio) of maximum loading (subject to limits) on the water circuit (700A).

As above, in the event of variable speed drive(s) or plant pump(s) failure, an integral bypass switch (not shown here), can be operated either manually or automatic, will allow said pumps to be operated at full speed. At the same time, an alarm signal will be shown and sent to an appropriate location as required alerting appropriate personnel to take necessary actions.

Figure 8A:
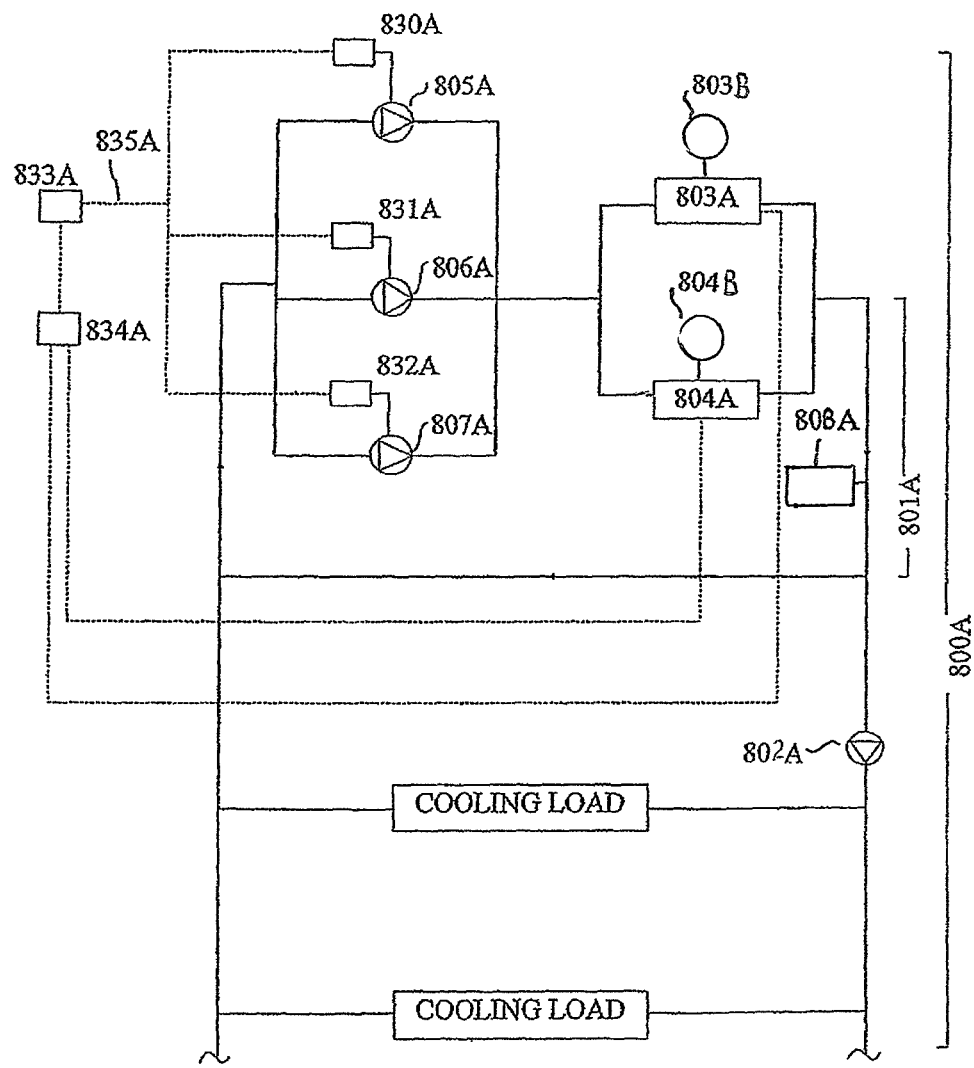
FIG. 8A is a schematic of a typical HVAC system with a plant-building loop (also known as "primary-secondary circuit") chilled/boiler water system in accordance with another embodiment of the invention.

FIG. 8A illustrates a fourth embodiment of this invention utilizing variable speed control of three primary chilled water/boiler pumps operating at predetermined equal reduced speed or at almost equal reduced speed or at similar reduced speed in lieu of the original/traditional designed pumping arrangement as shown in FIG. 3 when one chiller (803A or 804A) is operating. A chilled water/boiler circuit (800A) (plant-building loop system) (also known as primary-secondary chilled/boiler water circuit), in this case, in the plant loop (801A), three plant motor/pump sets (805A, 806A and 807A) of the same or near the same capacity, and each including a pump driven by its own electric motor, are deployed to transport the produced chilled/boiler water through the plant loop water circuit (801A) (primary loop) if one chillers/boilers (803A or 804A) is operating at the mean time in accordance with the current loading. A secondary circuit pump 802A circulates water in the secondary circuit containing the cooling loads.

The three pumps of the pump/motor sets (805A, 806A and 807A) are connected in parallel and operate in predetermined equal reduced speed or almost equal reduced speed or similar reduced speed simultaneously in lieu of the original/traditional designed pumping arrangement as shown in FIG. 3. The three pumps and corresponding motors (805A, 806A and 807A) are controlled by respective variable speed drives connected to the respective pump drive motors (VSD 830A corresponds to plant pump 805A, VSD 831A corresponds to plant pump 806A, VSD 832A corresponds to plant pump 807A) and the said drives (830A, 831A, 832A) are commanded by a Controller (833A). The Controller (833A), monitors the present loading on the water system either by measuring the present power consumption of operating chiller' (803 A or 804A) compressor using a power sensor, or the speed of the operating chiller' (803A or 804A) compressor using a tachometer (803B, 804B) or measuring the discharged chilled water/boiler temperature by temperature sensor (808A) located in appropriate location in the water circuit or some other means from which loading can be inferred. Based on that loading signal (834A), an algorithm calculates the optimum power loading (subject to limits) for the pumps and sends an output signal (835A) to the three variable speed drives (830A, 831A, 832A) operating the motors of the three corresponding plant pumps (805A, 806A,807A) such that the three plant pumps (805A, 806A and 807A) are incorporated to run at equal reduced speed or at almost equal reduced speed or at similar reduced speed simultaneously and operate at the optimum power percentage (or ratio)(subject to limits) of maximum power draw based on the present percentage (or ratio) of maximum loading on the water circuit (800A).

In the event of variable speed drive(s) or plant pump(s) failure, an integral bypass switch (not shown here), can be operated either manually or automatic, will allow said operative pumps to be operated at a predetermined speed. At the same time, an alarm signal will be shown and sent to appropriate location as required alerting appropriate personnel to take necessary actions.

Figure 9A:
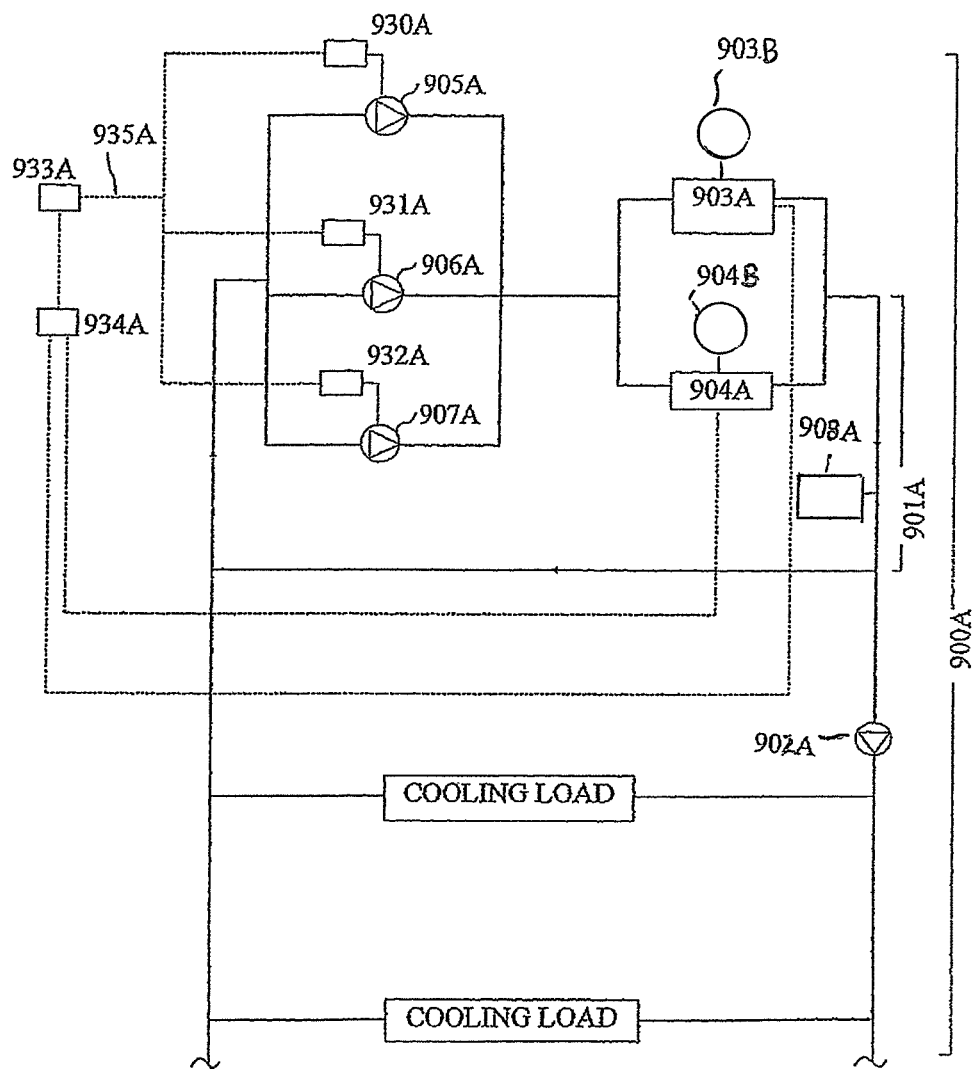
FIG. 9A is a schematic of a typical HVAC system with a plant-building loop (also known as "primary-secondary circuit") chilled/boiler water system in accordance with another embodiment of the invention.

FIG. 9A illustrates a fifth embodiment of this invention utilizing variable speed control of three primary chilled water/boiler pumps operating at predetermined equal reduced speed or almost equal reduced speed or similar reduced speed simultaneously in lieu of the original/traditional designed pumping arrangement as shown in FIG. 3 when two chillers (903A and 904A) are operating. A chilled water/boiler circuit (900A) ("plant-building loop system" also known as "primary-secondary chilled/boiler water circuit"), in this case, in the plant loop (901A), three plant motor/pump sets (905A, 906A and 907A) of the same or near the same capacity, and each including a pump driven by its own electric motor, are deployed to transport the produced chilled/boiler water through the plant loop water circuit (901A) (also known as "primary loop") if two chillers/boilers (903A and 904A) are operating at the mean time in accordance with the current loading. A secondary circuit pump 902A circulates water in the secondary circuit containing the cooling loads.

The three pumps of each pump/motor set (905A, 906A and 907A) are connected in parallel and operate in predetermined equal reduced speed or almost equal reduced speed or similar reduced speed simultaneously. The three pumps and corresponding motors (905A, 906A and 907A) are controlled by respective variable speed drives connected to the respective pump drive motors (VSD 930A corresponds to plant pump 905A, VSD 931A corresponds to plant pump 906A, VSD 932A corresponds to plant pump 907A) and the said drives (930A, 931A, 932A) were commanded by a Controller (933A). The Controller (933A), monitors the present loading on the water system either by measuring the present power consumption of operating chillers' (903A and 904A) compressor using a power sensor, or the speed of the operating chillers' (903A or 904A) compressor using a tachometer (903B, 904B) or measuring the discharged chilled water/ boiler temperature by temperature sensor (902A) located in appropriate location in the water circuit or some other means, from which loading can be inferred. Based on that loading signal (934A), an algorithm calculates the optimum power loading (subject to limits) for the pumps and sends an output signal (935A) to the three variable speed drives (930A, 931A, 932A) operating the three corresponding motors of the plant pump/motor sets (905A, 906A,907A) such that the three plant pump motor sets (905A, 906A and 907A) are incorporated to run at equal reduced speed or almost equal reduced speed or similar reduced speed simultaneously and operate at the optimum power percentage (or ratio)(subject to limits) of maximum power draw based on the present percentage (or ratio) of maximum loading on the water circuit (900A).

In the event of variable speed drive(s) or plant pump(s) failure, an integral bypass switch (not shown here), can be operated either manually or automatic, will allow said operative pumps to be operated at a predetermined speed. At the same time, an alarm signal will be shown and sent to appropriate location as required alerting appropriate personnel to take necessary actions.

Figure 10A:
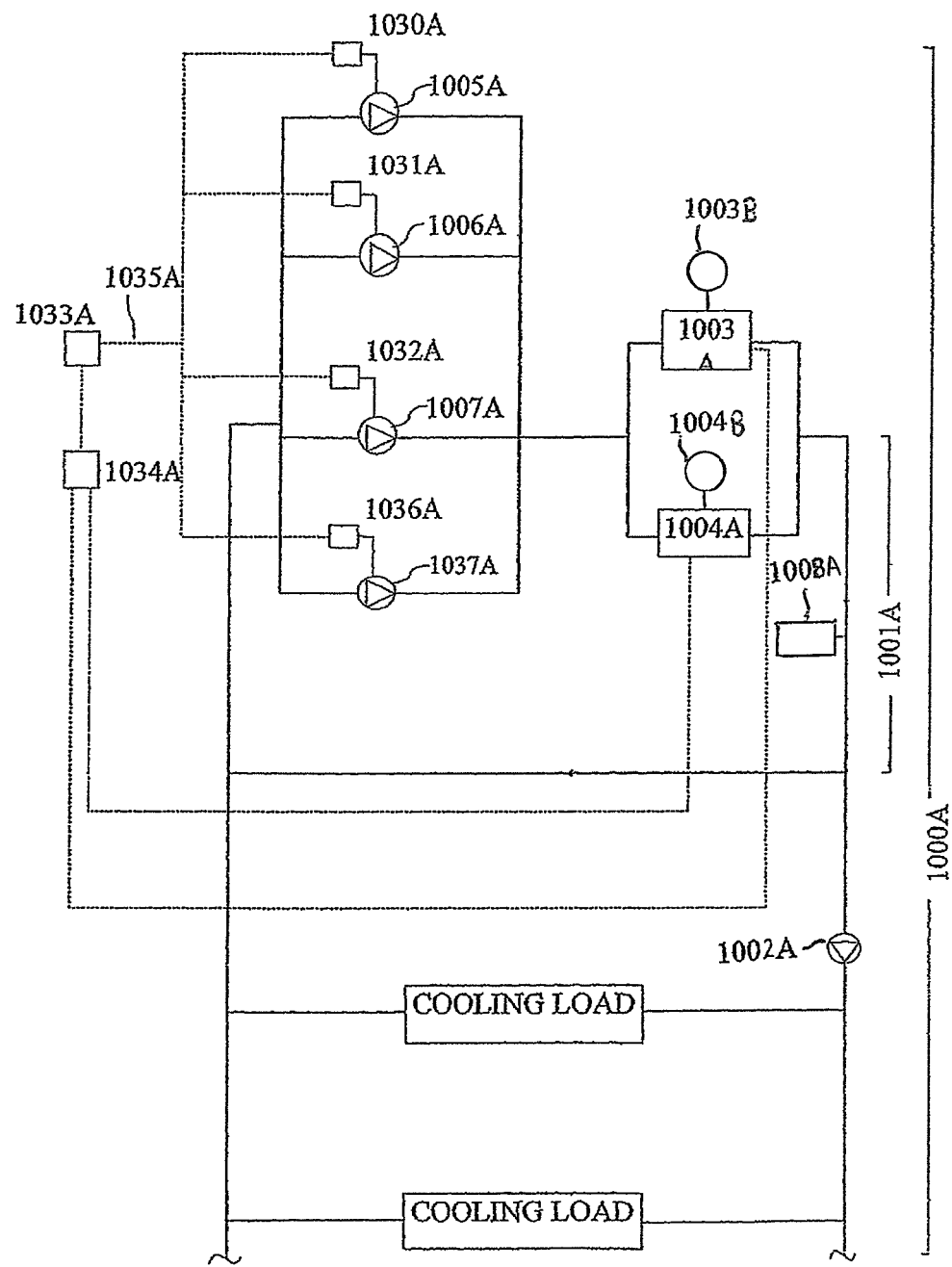
FIG. 10A is a schematic of a typical HVAC system with a plant-building loop (also known as "primary-secondary circuit") chilled/boiler water system in accordance with another embodiment of the invention.

FIG. 10A illustrates sixth embodiment of this invention utilizing variable speed control of four primary chilled water/boiler pumps operating at predetermined equal reduced speed or almost equal reduced speed or similar reduced speed in lieu of the original/traditional pumping arrangement as shown in FIG. 3 when two chillers are operating. A chilled water/boiler circuit (1000A) ("plant-building loop system" also known as "primary-secondary chilled water/boiler circuit"), in this case, in the plant loop (1001A), four plant motor/pump sets (1005A, 1006A, 1007A, 1037A) of the same or near the same capacity, and each including a pump driven by its own electric motor, are deployed to transport the produced chilled/boiler water through the plant loop water circuit (1001A) (primary loop), two chillers/boiler (1003A and 1004A) are operating at the mean time in accordance with the current loading. A secondary circuit pump (1002A) circulates water in the secondary circuit containing the cooling loads.

The four plant pumps of the pump/motor sets (1005A, 1006A, 1007A, and 1037A) are connected in parallel and operate in predetermined equal reduced speed or almost equal reduced speed or similar reduced speed simultaneously. Said four pumps and corresponding motors (1005A,1006A, 1007A,1037A) are controlled by respective variable speed drives (VSD 1030A corresponds to plant pump 1005A, VSD 1031A corresponds to plant pump 1006A, VSD 1032A corresponds to plant pump 1007A, VSD 1036A corresponds to plant pump 1037A) connected to the respective pump drives and the said drives (1030A,1031A,1032A,1036A) are commanded by a Controller (1033A). The Controller (1033A), monitors the present loading on the water system either by measuring the present power consumption of operating chillers' (1003A and 1004A) compressors using a power sensor, or the speed of the operating chillers' (1003A and 1004A) compressors using a tachometer (1003B, 1004B) or measuring discharged chilled/boiler water temperature by temperature sensor (1008A) located in appropriate location in the water circuit or some other means from which loading can be inferred. Based on that loading signal (1034A), an algorithm calculates the optimum power loading (subject to limits) for the pumps and sends an output signal (1035A) to the respective variable speed drives (1030A, 1031A, 1032A, 1036A) operating the corresponding motors of the plant pump/motor sets (1005A, 1006A, 1007A, 1037A) such that the four pumps of the sets (1005A, 1006A, 1007A, 1037A) are incorporated to run at equal reduced speed or almost equal reduced speed or similar reduced speed simultaneously and operate at the optimum power percentage (or ratio)(subject to limits) of maximum power draw based on the present percentage (or ratio) of maximum loading on the water circuit (1000A).

In the event of variable speed drive(s) or plant pump(s) failure, an integral bypass switch (not shown here), can be operated either manually or automatic, will allow said operative pumps to be operated at a predetermined speed. At the same time, an alarm signal will be shown and sent to an appropriate location as required alerting appropriate personnel to take necessary actions.

Figure 11A:
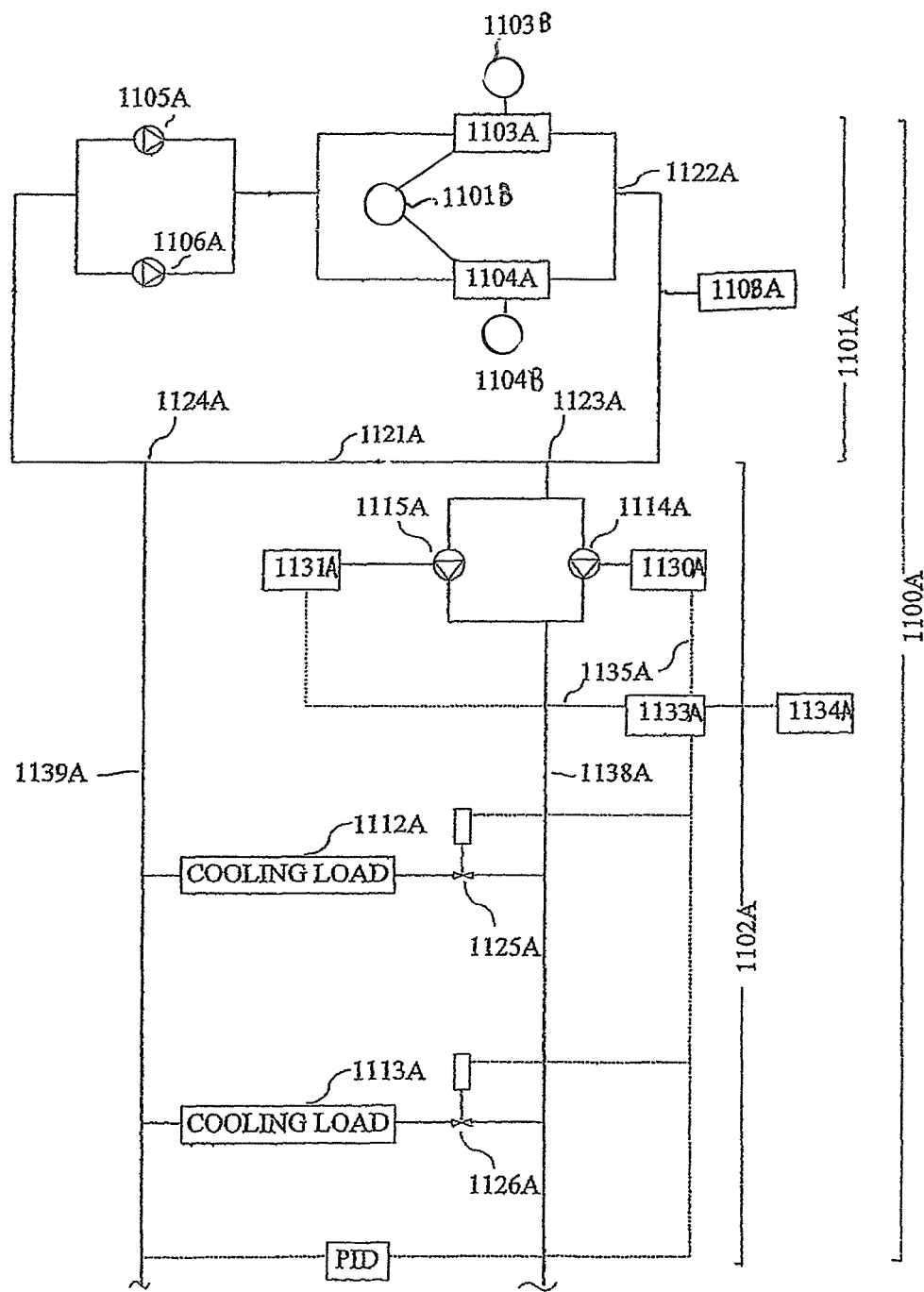
FIG. 11A is a schematic of a typical HVAC system with a plant-building loop (also known as "primary-secondary circuit") chilled/boiler water system in accordance with another embodiment of the invention.

FIG. 11A illustrates seventh embodiment of this invention utilizing variable speed control of two secondary chilled water/boiler pumps operating at predetermined equal reduced speed or almost equal reduced speed or similar reduced speed in lieu of the original/traditional designed pumping arrangement as shown in FIG. 3 when chiller(s) is operating. A chilled/boiler water circuit (1100A) ("plant-building loop system" also known as "primary-secondary chilled/boiler water circuit"), in this case, in the plant loop (1101A) (also known as primary loop), chilled/boiler water leaving the chillers/boilers (1103A, 1104A) at point (1122A) flows through the junction of the common pipe (1121A), plant loop (1101A) and building loop (1102A) at point (1123A), is extracted by the building pumps (also called secondary chilled/boiler water pumps) (1114A and 1115A); and is supplied to the cooling loads (1112A, 1113A). Two building motor/pump sets (secondary chilled/boiler water pumps) (1114A and 1115A) of the same or near the same capacity, and each including a pump driven by its own electric motor, are deployed to transport the produced chilled/boiler water through the building loop water circuit (1102A) (also known as "secondary loop"). The chilled/boiler water flows through valves (1125A, 1126A) to cooling loads (1112A, 1113A) through the supply (1138A) and return (1139A) mains.

The pumps of the pump/motor sets (1114A and 1115A) are connected in parallel and operate in predetermined equal reduced speed or almost equal reduced speed or similar reduced speed simultaneously. The pumps and corresponding motors (1114A and 1115A) are controlled by corresponding variable speed drive (VSD 1130A corresponds to building pump 1114A, VSD 1131A corresponds to building pump 1115A) and the said drives (1130A and 1131A) are commanded by a Controller (1133A). The Controller (1133A), monitors the present loading on the water system either by measuring the present power consumption of operating chiller(s)' (1103A, 1104A) compressor using a power sensor (1101B) or the speed of the operating chiller(s)' (1103 A or 1104A) compressor using a tachometer (1103B, 1104B) and measuring discharged chilled/boiler water temperature by temperature sensor (1108A) located in appropriate location in the water circuit and the pressure differential of the building loop by pressure differential transmitter (PID) located in appropriate location in the building loop, or some other means from which loading can be inferred. Based on these loading signals (1134A), an algorithm calculates the optimum power loading (subject to limits) for the building pumps (1114A and 1115A) and sends an output signal (1135A) to the respective two variable speed drives (1130A and 1131A) operating the motors of the two corresponding building pump/motor sets (1114A and 1115A) such that the two corresponding building pumps (1114A and 1115A) are incorporated to run at equal reduced speed or almost equal reduced speed or similar reduced speed simultaneously and operate at the optimum power percentage (or ratio)(subject to limits) of maximum power draw based on the present percentage (or ratio) of maximum loading (subject to limits) on the building loop circuit (1102A).

As described above, in the event of variable speed drive(s) or building pump(s) failure, an integral bypass switch (not shown here), can be operated either manually or automatic, will allow said operative pump to be operated at full speed. At the same time, an alarm signal will be shown and sent to an appropriate location as required alerting appropriate personnel to take necessary actions.

Figure 12A:
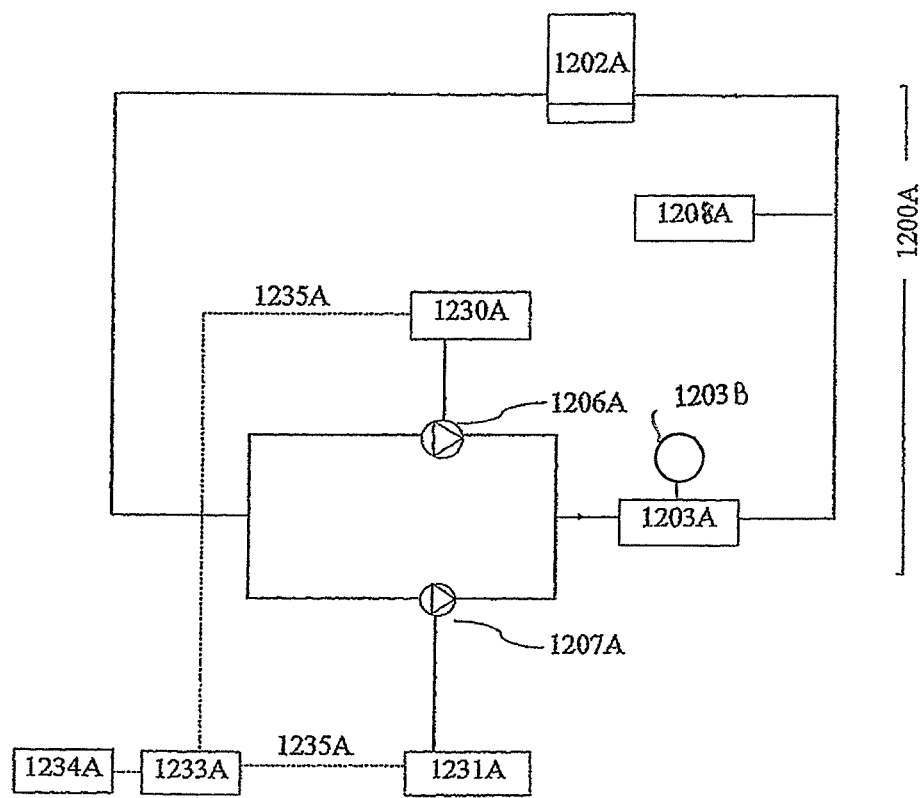
FIG. 12A is a schematic of a typical HVAC system with a condenser water circuit in accordance with another embodiment of the invention.

FIG. 12A illustrates eighth embodiment of this invention utilizing variable speed control of two condenser water pumps operating at predetermined equal reduced speed or almost equal reduced speed or similar reduced speed in lieu of the original/traditional designs' pumping arrangement as shown in FIG. 4 when one chiller is operating. In this case, in the condenser water circuit (1200A), two condenser pump/motor sets (1206A and 1207A) of the same or near the same capacity, and each set including a pump driven by its own electric motor, are deployed to transport the produced condenser water generated by the chiller (1203A) through the condenser water circuit (1200A) and reject the heat energy through the cooling tower (1202A) to outside atmosphere.

The condenser pumps of the pump/motor sets (1206A and 1207A) are connected in parallel and operate in predetermined equal reduced speed or almost equal reduced speed or similar reduced speed simultaneously. The condenser pumps and corresponding motors (1206A and 1207A) are controlled by corresponding variable speed drive (VSD 1230A corresponds to condenser pump 1206A, VSD 1231A corresponds to condenser pump 1207A) connected to the respective motors and the said drives (1230A, 1231A) are commanded by a Controller (1233A). The Controller (1233A), monitors the present loading on the water system either by measuring the present power consumption of operating chiller's (1203A) compressor using a power sensor, or the speed of the operating chiller's (1203A) compressor using a tachometer (1203B) or measuring discharged chilled water temperature and the discharged condenser water temperature by temperature sensor (1208A) located in appropriate location in the water circuit or some other means from which loading can be inferred. Based on these loading signals (1234A), an algorithm calculates the optimum power loading (subject to limits) for the pumps and sends an output signal (1235A) to the respective two variable speed drives (1230A, 1231A) operating the motors of the two corresponding condenser pump/motor sets (1206A,1207A) such that the two corresponding condenser pumps of the sets (1206A,1207A) are incorporated to run at equal reduced speed or almost equal reduced speed or similar reduced speed simultaneously and operate at the optimum power percentage (or ratio)(subject to limits) of maximum power draw based on the present percentage (or ratio) of maximum loading (subject to limits) on the condenser water circuit (1200A).

As described above, in the event of variable speed drive(s) or condenser water pump(s) failure, an integral bypass switch (not shown here), can be operated either manually or automatic, will allow the operative pump to be operated at full speed. At the same time, an alarm signal will be shown and sent to an appropriate location as required alerting appropriate personnel to take necessary actions.

Figure 13A:
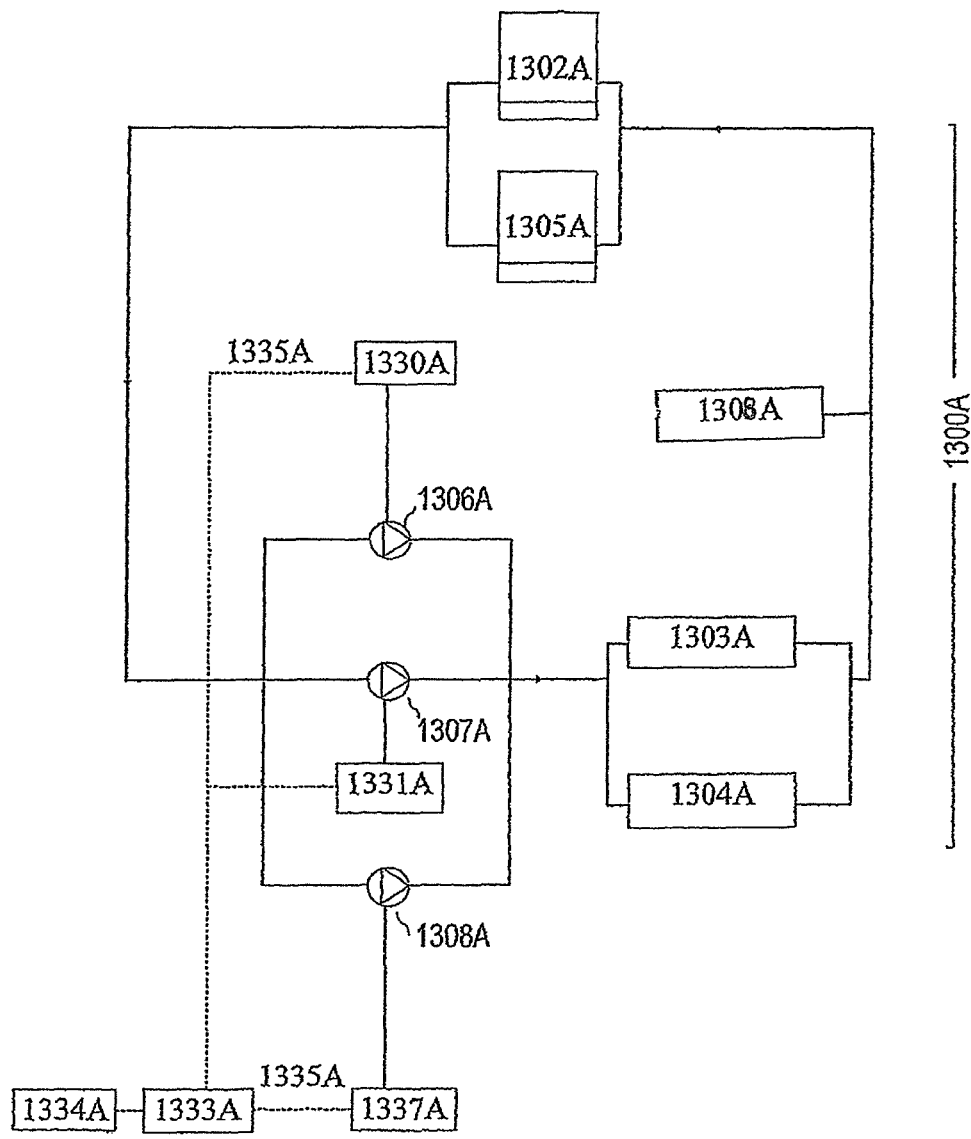
FIG. 13A is a schematic of a typical HVAC system with a condenser water circuit in accordance with another embodiment of the invention.

FIG. 13A illustrates ninth embodiment of this invention utilizing variable speed control of three condenser water pumps operating at predetermined equal reduced speed or almost equal reduced speed or similar reduced speed in lieu of the original/traditional pumping arrangement as shown in FIG. 4 when chiller(s) is operating. In this case, in the condenser water circuit (1300A), three condenser motor/pump sets (1306A, 1307A and 1308A) of the same or near the same capacity, and each including a pump driven by its own electric motor, are deployed to transport the produced condenser water generated by the chiller(s) (1303A,1304A) through the condenser water circuit (1300A) and reject the heat energy through the cooling tower(s) (1302A, 1305A) to outside atmosphere. In this case, in the condenser water circuit (1300A), three condenser pumps of the pump/motor sets (1306A, 1307A and 1308A) of the same or near the same capacity are deployed to transport the produced condenser water through the condenser water circuit (1300A) if chiller(s) (1303A,1304A) is operating at the mean time in accordance with the current loading.

The three condenser pumps of the pump/motor sets (1306A, 1307A and 1308A) are connected in parallel and operate in predetermined equal reduced speed or almost equal reduced speed or similar reduced speed simultaneously. The three condenser pumps and corresponding motors (1306A, 1307A and 1308A) are controlled by respective variable speed drives (VSD 1330A corresponds to condenser pump 1306A, VSD 1331A corresponds to condenser pump 1307A, VSD 1337A corresponds to condenser pump 1308A) and the said drives (1330A, 1331A, 1337A) are commanded by a Controller (1333A). The Controller (1333A), monitors the present loading on the water system either by measuring the present power consumption of operating chiller(s)' (1303A, 1304A) compressor using a power sensor, or the speed of the operating chiller(s)' (1303A,1304A) compressor or measuring discharged chilled water temperature and discharged condenser water temperature leaving the chiller by temperature sensor (1308A) located in appropriate location in the water circuit or some other means from which loading can be inferred. Based on that loading signal (1334A), an algorithm calculates the optimum power loading (subject to limits) for the pumps and sends an output signal (1335A) to the three variable speed drives (1330A, 1331A, 1337A) operating the motors of the three corresponding condenser pump/motor sets (1306A, 1307A, 1308A) such that the three condenser pump/motor sets (1306A, 1307A and 1308A) are incorporated to run at equal reduced speed or almost equal reduced speed or similar reduced speed simultaneously and operate at the optimum power percentage (or ratio)(subject to limits) of maximum power draw based on the present percentage (or ratio) of maximum loading on the water circuit (1300A).

Again, in the event of variable speed drive(s) or condenser pump(s) failure, an integral bypass switch (not shown here), can be operated either manually or automatic, will allow the operative pumps to be operated at a predetermined speed. At the same time, an alarm signal will be shown and sent to appropriate location as required alerting appropriate personnel to take necessary actions.

Figure 14A:
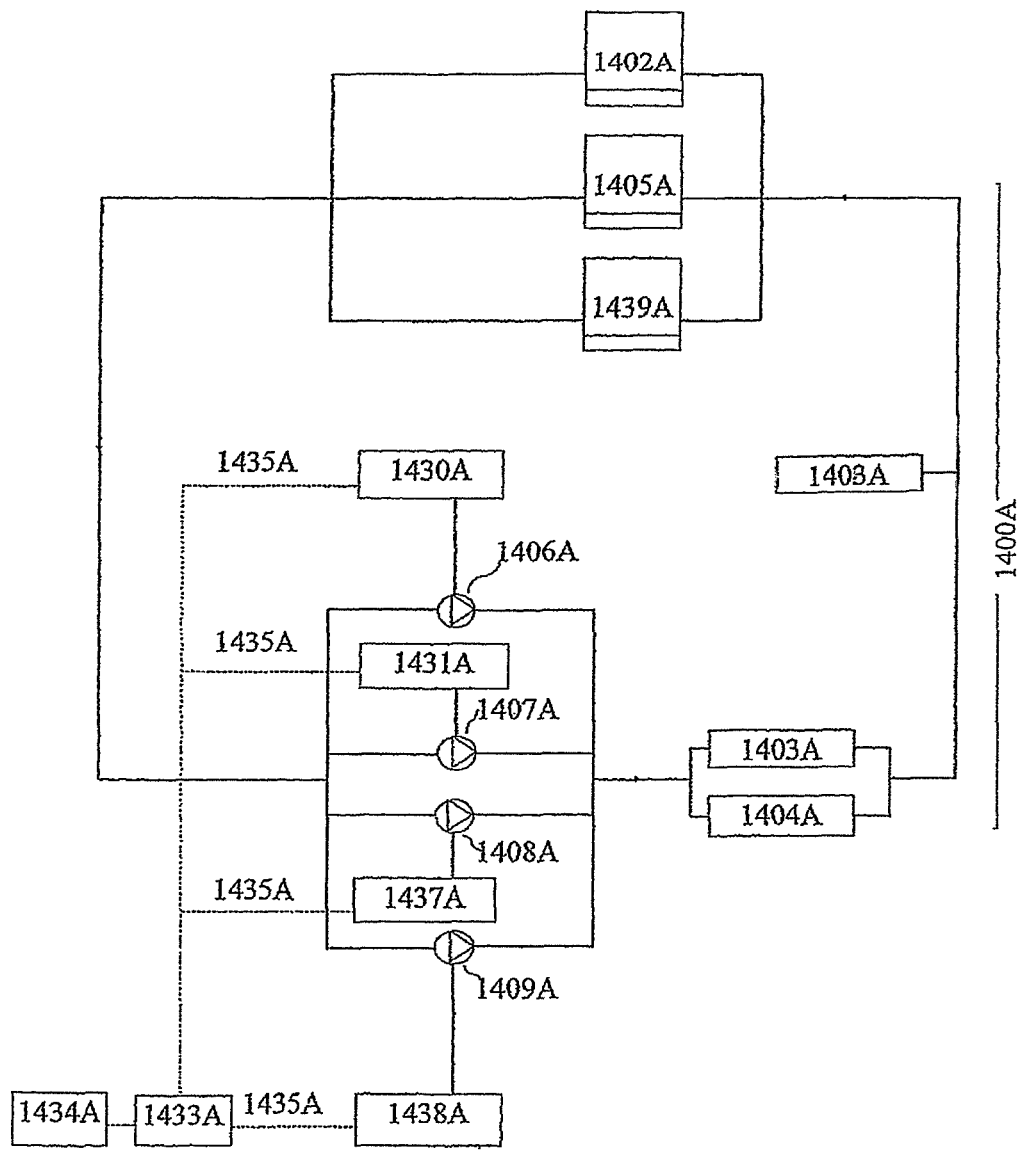
FIG. 14A is a schematic of a typical HVAC system with a condenser water circuit in accordance with another embodiment of the invention.

FIG. 14A illustrates tenth embodiment of this invention utilizing variable speed control of four condenser water pumps operating at predetermined equal reduced speed or almost equal reduced speed or similar reduced speed in lieu of the original/traditional designed pumping arrangement as shown in FIG. 4 when two chillers are operating. In this case, in the condenser water circuit (1400A), four condenser motor/pump sets (1406A, 1407A, 1408A and 1409A) of the same or near the same capacity, and each including a pump driven by its own electric motor, are deployed to transport the produced condenser water generated by the chillers (1403A and 1404A) through the condenser water circuit (1400A) and reject the heat energy through the cooling towers (1402A, 1405A, 1439A) to outside atmosphere.

In this case, in the condenser water circuit (1400A), four condenser pumps (1406A, 1407A, 1408A, 1409A) of the same or near the same capacity are deployed to transport the produced condenser water through the condenser water circuit (1400A) if two chiller (1403A and 1404A) are operating at the mean time in accordance with the current loading.

The four condenser pumps of each pump/motor set (1406A, 1407A, 1408A, and 1409A) are connected in parallel and operate in predetermined equal reduced speed or almost equal reduced speed or similar reduced speed simultaneously. The four condenser pumps and corresponding motors (1406A, 1407A, 1408A, 1409A) are controlled by respective variable speed drives (VSD 1430A corresponds to condenser pump 1406A, VSD 1431A corresponds to condenser pump 1407A, VSD 1437A corresponds to condenser pump 1408A, VSD 1438A corresponds to condenser pump 1409A) and the said drives (1430A, 1431A, 1437A, 1438A) are commanded by a Controller (1433A). The Controller (1433A), monitors the present loading on the water system either by measuring the present power consumption of operating chillers' (1403A and 1404A) compressor using a power sensor, or the speed of the operating chillers' (1403A and 1404A) compressor or measuring discharged chilled water temperature and discharged condenser water temperature leaving the chillers by temperature sensor (1408A) located in appropriate location in the water circuit or some other means from which loading can be inferred. Based on that loading signal (1434A), an algorithm calculates the optimum power loading (subject to limits) for the pumps and sends an output signal (1435A) to the four variable speed drives (1430A, 1431A, 1437A, 1438A) operating the four corresponding condenser pumps (1406A, 1407A, 1408A, 1409A) such that the four condenser pumps of the pump/motor sets (1406A, 1407A, 1408A, 1409A) incorporated to run at equal reduced speed or almost equal reduced speed or similar reduced speed simultaneously and operate at the optimum power percentage (or ratio)(subject to limits) of maximum power draw based on the present percentage (or ratio) of maximum loading on the water circuit (1400A).

As above, in the event of variable speed drive(s) or condenser pump(s) failure, an integral bypass switch (not shown here), can be operated either manually or automatic, will allow the operative pumps to be operated at a predetermined speed. At the same time, an alarm signal will be shown and sent to appropriate location as required alerting appropriate personnel to take necessary actions.

It will be appreciated that above preferred embodiments, primary chilled water pumps, secondary chilled water pumps, condenser water pumps, boiler pumps, are shown for illustration, the system can include additional units of said pumping arrangements. Additional loads can also be connected to the system, and the plurality of operating pump means can act responsive to a predetermined target. I.e. a certain flow rate, a certain pressure differential, a desired discharge pressure, etc.

It will be appreciated that the present invention has application in a large range of industrial fields where pumps are used for pumping fluids and where the pumping loads are at maximum or vary. The features of the invention are then able to be used to improve the system efficiencies.

EXAMPLES

Example 1

Development of an Embodiment of the Invention in "Primary Chilled Water Circuit" of a Medium Size Hotel A medium size hotel with 270 guestrooms is equipped with 3 identical capacity 18 KW primary chilled water pumps. Only one primary chilled water pump is used to circulate the chilled water through the primary chilled water circuit of the HVAC System while the remaining two pumps are in standby mode. The operating pump is allowed to run uncontrolled at its maximum flow.
Constraints
1. Chiller Manufacturer recommends a constant flow of water through the chiller evaporator (the primary chilled water circuit) of the HVAC system.
2. Variable flow in the primary chilled water circuit may cause instable operation or nuisance shutdown of the chillers; therefore, chiller manufacturers specify minimum limit for evaporator water flows.
3. Insufficient flow in the primary chilled water circuit may lead to freeze up in the evaporator and caused severe damage to the chiller (ruptured the evaporator tube)
4. Reduced flow in primary chilled water circuit decreases the overall heat-transfer effectiveness of the evaporator as the convective heat transfer coefficient decreases with a reduction in flow.

Action Taken
1. Three variable frequency drives and one PLC were fitted on the primary chilled water pumps. The system is coordinated with the building management system, enabling easy monitoring of the pump's operation.
2. Two of the pumps are operated to run at equal reduced speed about 50% of the maximum speed providing the required constant flow capacity of the original systems design requirement. Previously only one pump ran continuously at maximum speed.

Results

The measures resulted in significant energy savings. The total power consumption of the two operating primary chilled water pumps after fitting of our invention fell by nearly 72 percent compared with a theoretical saving of 75 percent ($2 \times 0.5^3 = 0.25$) in a perfect condition. Analysis showed that the energy saved was 113,529 kWh per year, resulting in an annual saving of USD 14,600. In addition, an annual maintenance cost was saved due to the lower pressure imparted to the system, reduced excessive vibration and loading on the operating pumps and respective pipeline.

Example 2

In a pilot test, three variable frequency drives and one PLC were fitted on the primary chilled water pumps. The system is coordinated with the building management system, enabling easy monitoring of the pump's operation.

Three pumps were run at equal reduced speed of about 34% of the maximum speed providing the required constant flow capacity of the original systems design requirement.

Results

The measures resulted in significant energy savings. The total power consumption of the three operating primary chilled water pumps after incorporation of the described embodiment of the invention fell by nearly 85 percent ($3 \times 0.34^3 = 0.12$). Analysis showed that the energy saved was 134,028 kWh per year, resulting in a potential annual saving of USD 17,230.

| | Annual Analysis Results | | |
|---|---|---|---|
| System Flow Alternatives | Pumping Energy Consumed | Operating Costs, US Currency | Annual Cost Saving, US Currency |
| Constant Primary | 157,680 kWh | $20,270 | NIL |
| Running Two Pumps at Reducing Speed | 44,150 kWh | $ 5,670 | 14,600 |
| Running Three Pumps at Reducing Speed | 23,652 kWh | $ 3,040 | 17,230 |

As the analysis results show, the examples of the inventive system can yield substantial savings when compared with the standard, constant-primary flow design.

Example 3

Development of an Embodiment of the Invention in "Secondary Chilled Water Circuit". (Under Proposed Stage)

The said medium size hotel with 270 guestrooms is equipped with two 75 KW secondary chilled water pumps.

One secondary chilled water pump is used to circulate the water through the secondary chilled water circuit of the HVAC System while the remaining pump is in standby mode. One operating pump is allowed to run at its maximum flow for 20 hours (00:00 to 14:00 and 18:00 to 24:00) and at 15% reduced speed of its maximum speed for 4 hours (14:00 to 18:00) under low loading condition.

Constraints

1. Reduced flow in secondary chilled water circuit decreases the overall heat-transfer effectiveness as the heat transfer coefficient decreases with a reduction in flow.
2. the original system has installed two variable speed drives to the respective pumps and one pump is running at 85% of maximum speed for a specific period during daytime and has achieving a 10% of energy saving. The remaining pump is under standby condition.
3. The embodiment of the invention must provide significant further saving in order to justify to the user that investment in the system is worthwhile.

Action Taken

1. Two variable frequency drives and one PLC is fitted on the secondary chilled water pumps. The system is coordinated with the building management system, enabling easy control of the pump's operation.
2. Two operating chilled water pumps are run at equal reduced speed between 43-50% of the maximum speed in accordance with the load, Results Analysis showed that a further 60% of energy can be saved in comparison with the original designed one secondary chilled pumps riming at 15% of reducing speed for a specific period (4 hours daily) which can achieved 10% of energy saving only. The anticipated power consumption of the two operating secondary chilled water pumps fell by at least 70% totally. Analysis showed that the estimated energy that can be saved was 459,900 kWh per year, resulting in an annual saving of USD 59,120. In addition, an annual maintenance cost can be saved due to the lower pressure imparted to the system, reduced excessive vibration and loading on the operating pumps and the piping system.

| System Flow Alternatives | Estimated Pumping Energy Consumed | Operating Costs, US Currency | Annual Cost Saving, US Currency |
|---|---|---|---|
| Annual Analysis Results | | | |
| Constant Secondary | 657,000 kWh | 84,450 | NIL |
| Variable Secondary | 591,300 kWh | 76,000 | $ 8,450 |
| Running Two Pumps at Reducing Speed | 197,100 kWh | 25,330 | $59,120 |

As the analysis results show, the described embodiment can yield substantial savings when compared with a variable-secondary flow design.

Example 4

Development of an Embodiment of the Invention in Small "Single Chilled Water Circuit"

A manufacturer with 3000 square feet floor area is equipped with two 12.5 KW chilled water pumps. One chilled water pump is used to circulate the chilled water through the single chilled water circuit of the HVAC while the other pump is in standby mode. The operating pump was allowed to run uncontrolled at its maximum flow.

Constraints

1. Chiller Manufacturer recommends a constant flow of water through the chiller evaporator (the single chilled water circuit) of the HVAC system.
2. Variable flow in the single chilled water circuit may cause instable operation or nuisance shutdown of the chiller; therefore, chiller manufacturers specify minimum limit for evaporator water flows.
3. Insufficient flow in the single chilled water circuit may lead to freeze up in the evaporator and caused severe damage to the chiller. (ruptured the evaporator tube)
4. Reduced flow in chilled water circuit decreases the overall heat-transfer effectiveness of the evaporator as the convective heat transfer coefficient decreases with a reduction in flow.
5. Optional market available energy saving methods such as "chilled water reset", "colder water, series evaporator", "colder water, lower flow", or simply "variable flow" are neither technologically viable or would be economically acceptable by the HVAC owner due to the following reasons:
    1. High upfront investment
    2. Long payback period (3 years or above) or unsatisfactory return
    3. Involve complicated modification or complexity for control and operational method.
    4. The chiller control cannot accommodate for such arrangements.

Action Taken

1. Two variable frequency drives and one PLC were fitted on the single circuit chilled water pumps.
2. Two single circuit chilled water pumps run at equal reducing speed, about 50% of the maximum speed providing the required constant flow capacity of the original system design requirement and no standby pump are provided and be necessary in this situation as bypass and changeover capability is available in case of emergency/maintenance situations.

Results

The measures resulted in significant energy savings. The power consumption of the operating single circuit chilled water pump fell by nearly 73%. Analysis showed that the energy saved was 79,935 kWh per year, resulting in an annual saving of USD 10,270. In addition, a significant maintenance cost was saved due to the lower pressure imparted to the system, reduced excessive vibration and loading on the operating pump and the pipe line.

Example 5

An additional pump is added to the single circuit chilled water system of Example 4 so that three chilled water pumps are now used, and they are equipped with three variable frequency drives and one PLC fitted to the chilled water pumps. The system is equipped with the bypass and changeover capability, enabling safe operation of the pumping system in case of emergency/maintenance situation. The three pumps are run at substantially equal reduced speed, about 34% of the maximum speed providing the required constant flow capacity of the original systems design requirement.

Results

The estimated total power consumption of the three operating primary chilled water pumps fell by nearly 85%. Analysis showed that the estimate energy saving is 93,075 kWh per year, resulting in an annual saving of USD 11,960.

Annual Analysis Results

| System Flow Alternatives | Pumping Energy Consumed | Operating Costs, US Currency | Annual Cost Saving US Currency |
|---|---|---|---|
| Constant Single Circuit | 109,500 kWh | $14,070 | NIL |
| Running Two Pumps at Reducing Speed | 29,565 kWh | $ 3,800 | $10,270 |
| Running Three Pumps at Reducing Speed | 16,425 kWh | $ 2,110 | $11,960 |

As the analysis results show, the described embodiments of the inventive system can yield substantial savings when compared with a constant single circuit flow design.

Example 6

A central condenser water supply plant is equipped with three 450 KW central condenser water pumps. One condenser water pump is used to circulate sea water through the region's building condenser water circuits of the HVAC Systems while the remaining two condenser pumps are in standby mode.

Constraint
1. The original system designer recommend constant flow configuration in the central condenser water supply circuit for HVAC systems' cooling in the region.
2. Variable flow in the central condenser water supply circuit may cause instable operation of the chillers in the region especially the compressor's operation.
3. Insufficient flow in the central condenser water circuit may lead to unacceptable temperature rise in the region's condensers and caused damage to the respective chillers.

Action Taken
Three variable frequency drives and one PLC were fitted on the central condenser water pumps. Two operating condenser water pumps run at about 50% of the maximum speed providing the required constant flow capacity of the original systems design requirement. Previously one of the pumps was allowed to run at its maximum flow while the remaining two pumps were in standby mode.

Results
Estimated energy savings of 70% can be achieved. The power consumption of the two operating central condenser water pumps after incorporating the inventive features is expected to fall by 70%. Analysis showed that the estimated energy to be saved is 2,759,400 kWh per year, resulting in an annual saving of USD 354,680. In addition, an annual maintenance cost to be saved due to the lower pressure imparted to the system, reduced excessive vibration and loading on the operating pumps and the piping system.

Example 7

Following the success of Example 6, a second stage improvement was implemented.

An additional, third pump was added to the central condenser water supply circuit thus totaling three condenser water pumps which run with three variable frequency drives and one PLC fitted on the condenser water pumps. The system is equipped with the bypass and changeover capability, enabling safe operation of the central condenser water supply system in case of emergency/maintenance situation.

The three condenser pumps are run at substantially equal reduced speed, about 34% of the maximum speed providing the required constant flow capacity of the original systems design requirement.

Results
The estimated total power consumption of the three operating condenser water pumps after fitting of the embodiment of the invention fell by nearly 84%. Analysis showed that the estimate energy saving is 3,311,280 kWh per year, resulting in an annual saving of USD 425,610.

Projected Annual Energy Consumption

| System Flow Alternatives | Estimated Pumping Energy Consumed | Operating Costs, US Currency | Anticipated Annual Cost Saving US Currency |
|---|---|---|---|
| Constant Condenser | 3,942,000 kWh | $506,680 | NIL |
| Running Two Pumps at Reducing Speed | 1,182,600 kWh | $152,000 | $354,680 |
| Running Three Pumps at Reducing Speed | 630,720 kWh | $ 81,070 | $425,610 |

As the analysis results show, the inventive features can yield substantial savings when compared with a one pump constant-condenser flow design.

Example 8

Swimming Pool Water Re-Circulation Circuit

A residential estate's swimming pool is equipped with two 20 KW pool water recirculation pumps. One recirculation pump is used to circulate the pool water though the mechanical filtration and chemical treatment devices and then returned to the pool while the other pump is in standby mode. The operating pump was allowed to run uncontrolled at its maximum flow Constraints
1. Disinfection and treatment of swimming pool water is governed by certain standard and regulations.
2. The constancy of flow rate is mandated by local standard and specifications.
3. The system designer do recommend constant flow configuration in the pool water recirculation circuit.
4. A constant quality of pool water which satisfies sanitation standards, safety and appearance, to avoid spreading bacteria or contaminant causing diseases.
5. Variable flow in the pool water recirculation circuit in accordance with the turbidity of the pool water can not satisfy the respective standard and regulations requirements fully due to the following reason;
6. Insufficient flow in the pool water recirculation circuit may lead to undesirable excess of chemicals in the pool water and cause harmful to swimmer's health.

Action Taken
1. Two variable frequency drives and one PLC are fitted on the pool water recirculation pumps.
2. Two water circulating pumps are run at substantially equal reduced speed, about 50% of the maximum speed, providing the required constant flow capacity of the original system design requirement and no standby pump are provided or deemed necessary in this situation as bypass and changeover capability is available in case of emergency/maintenance situation.

Results
The measures have shown significant potential energy savings. The estimate power consumption of the operating pool water pump after incorporation of the inventive features fell by nearly 65%. Analysis showed that the energy to be saved is about 113,880 kWh per year, resulting in an annual saving of USD 14,600. In addition, a significant maintenance cost can be saved due to the lower pressure imparted to the system, reduced excessive vibration and loading on the operating pumps and the pipeline.

Projected Annual Energy Consumption

| System Flow Alternatives | Pumping Energy Consumed | Operating Costs, US Currency | Anticipated Annual Cost Saving US Currency |
|---|---|---|---|
| Constant Primary | 175,200 kWh | $22,520 | NIL |
| Running Two Pumps at Reducing Speed | 61,320 kWh | $ 7,880 | $14,640 |

As the analysis results indicate, the inventive system may yield substantial savings when compared with a constant-swimming pool water recirculation flow design.

Hereafter, in the claims, reference to a fluid treatment element is intended to cover a fluid treatment element or fluid modifying element, and as examples, specifically covers a chiller, a condenser, a boiler and a system load, as set forth previously in the specification and claims.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. An industrial fluid circulating system having at least one fluid circulation circuit, the system including:
   at least one fluid treatment element in said at least one fluid circulation circuit, said at least one fluid treatment element including one of the following:
      a chiller,
      a condenser,
      a boiler and
      a system load,
   a plurality of pumps, at least two of said pumps connected in a parallel arrangement with each other and each pump of the parallel arrangement of said at least two of said pumps connected to a same one of said at least one fluid treatment element to circulate a fluid through said at least one fluid circulation circuit,
   a separate motor driving each pump,
   a load detector to sense operating loads on the system and said at least one fluid circulation circuit, and
   a speed control configured to vary a speed of each said motor to thereby vary a pumping capacity of each said pump in response to the detected load on the system, such that said at least two of said parallel connected pumps operate to circulate fluid through said at least one fluid treatment element at all given power loads, and such that each pump of said at least two of said pumps connected in a parallel arrangement with each other that is operating in said at least one fluid circulation circuit runs simultaneously at all given power loads, relative to a maximum speed, at one of:
      a predetermined equal reduced speed,
      a predetermined almost equal reduced speed, and
      a predetermined similar reduced speed.

2. The industrial fluid circulating system according to claim 1, wherein said plurality of pumps comprise said at least two pumps of at least similar capacity for said same one of said at least one fluid treatment element to circulate fluid through said at least one fluid circulation circuit, operation of the pumps being controlled in accordance with one of:
   system load,
   a predetermined target, and
   manual judgment of skilled personnel.

3. The industrial fluid circulating system according to claim 1 or claim 2, wherein said speed control includes a plurality of variable speed drives each to operate an associated said pump.

4. The industrial fluid circulating system according to claim 2, wherein one of:
   the system load,
   the predetermined target, and
   the manual judgment of skilled personnel,
sets an operation speed of each of the plurality of pumps.

* * * * *